US009451601B2

(12) United States Patent
Pani et al.

(10) Patent No.: US 9,451,601 B2
(45) Date of Patent: Sep. 20, 2016

(54) METHOD FOR MULTIPLEXING DATA FOR MULTIPLE WIRELESS TRANSMIT/RECEIVE UNITS FOR HIGH SPEED DOWNLINK CHANNELS

(75) Inventors: Diana Pani, Montreal (CA); Benoit Pelletier, Montreal (CA); Sylvie Gomes, Douglaston, NY (US); Christopher R. Cave, Montreal (CA); Fengjun Xi, Huntington Station, NY (US); Joseph S. Levy, Merrick, NY (US); Hong Zhang, Manalapan, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 13/695,118

(22) PCT Filed: May 2, 2011

(86) PCT No.: PCT/US2011/034787
§ 371 (c)(1),
(2), (4) Date: Jul. 23, 2013

(87) PCT Pub. No.: WO2011/137432
PCT Pub. Date: Nov. 3, 2011

(65) Prior Publication Data
US 2013/0329652 A1 Dec. 12, 2013

Related U.S. Application Data

(60) Provisional application No. 61/329,996, filed on Apr. 30, 2010, provisional application No. 61/329,669, filed on Apr. 30, 2010.

(51) Int. Cl.
*H04W 28/06* (2009.01)
*H04W 72/04* (2009.01)
*H04W 72/12* (2009.01)

(52) U.S. Cl.
CPC ......... *H04W 72/042* (2013.01); *H04W 72/121* (2013.01); *H04W 72/1289* (2013.01)

(58) Field of Classification Search
CPC ..................... H04W 72/0446; H04W 72/04
USPC ................... 370/322, 329, 394, 429
See application file for complete search history.

(56) References Cited

U.S. PATENT DOCUMENTS 7,283,508 B2 * 10/2007 Choi et al. ..................... 370/341
7,406,070 B2 * 7/2008 Nilsson ........................ 370/342

(Continued)

FOREIGN PATENT DOCUMENTS

| CN | 101192878 A | 6/2008 |
|---|---|---|
| JP | 2008244559 A2 | 10/2008 |
| WO | 2008/111749 | 9/2008 |

OTHER PUBLICATIONS

3GPP™ Work Item Description, "UTRAN MIMO Enhancements, core part," (Mar. 2010).

(Continued)

*Primary Examiner* — Edan Orgad
*Assistant Examiner* — Emmanuel Maglo
(74) *Attorney, Agent, or Firm* — Volpe and Koenig, P.C.

(57) ABSTRACT

Method and apparatus for multiplexing data for multiple wireless transmit/receive units (WTRUs) for high speed downlink channels are disclosed. A WTRU may receive a joint high speed shared control channel (HS-SCCH) including a common part and WTRU-specific parts. The common part includes common control information for WTRUs multiplexed in one transmission time interval (TTI), and each of the WTRU-specific parts includes WTRU-specific control information for a corresponding WTRU. The WTRU receives a high speed physical downlink shared channel (HS-PDSCH) based on decoding on the joint HS-SCCH. The HS-SCCH may include a group WTRU identity shared by a group of WTRUs.

18 Claims, 16 Drawing Sheets

(56) References Cited

U.S. PATENT DOCUMENTS

| | | | |
|---|---|---|---|
| 7,424,038 B2* | 9/2008 | Yang | H04H 20/28 370/474 |
| 7,508,804 B2* | 3/2009 | Das et al. | 370/342 |
| 7,848,279 B2* | 12/2010 | Ranta-aho et al. | 370/328 |
| 7,889,755 B2 | 2/2011 | Malladi et al. | |
| 8,031,600 B2* | 10/2011 | Wu | 370/231 |
| 8,374,190 B2* | 2/2013 | Rudolf | H04W 52/286 370/336 |
| 8,532,066 B2* | 9/2013 | Fernandez-Corbaton et al. | 370/335 |
| 8,638,771 B2* | 1/2014 | Fernandez-Corbaton | H04B 1/7107 370/335 |
| 8,897,276 B2* | 11/2014 | Ranta-Aho | H04W 74/004 370/338 |
| 2006/0126577 A1* | 6/2006 | Yano | H04W 36/0088 370/337 |
| 2006/0268919 A1* | 11/2006 | Malladi et al. | 370/432 |
| 2007/0189236 A1* | 8/2007 | Ranta-aho et al. | 370/335 |
| 2007/0253373 A1 | 11/2007 | Gollamudi | |
| 2007/0253421 A1* | 11/2007 | Cai | H04J 3/247 370/394 |
| 2008/0144600 A1* | 6/2008 | Anderson | H04W 28/06 370/350 |
| 2008/0165724 A1* | 7/2008 | Wu | H04W 72/0453 370/320 |
| 2008/0186862 A1* | 8/2008 | Corbett | H04W 72/0486 370/237 |
| 2008/0225765 A1* | 9/2008 | Marinier et al. | 370/310 |
| 2008/0310324 A1* | 12/2008 | Chaponniere | 370/254 |
| 2009/0168683 A1* | 7/2009 | Franceschini et al. | 370/312 |
| 2010/0232356 A1* | 9/2010 | Maheshwari et al. | 370/328 |

OTHER PUBLICATIONS

3GPP™ Work Item Description, "UTRAN MIMO Enhancements," (Mar. 2010).

3GPP™ Work Item Description, "UTRAN MIMO Enhancements performance part," (Mar. 2010).

Nokia Siemens Networks et al., Concepts for HSPA MIMO Enhancement, 3GPP TSG-RAN WG1 Meeting #60bis, R1-102086 (Apr. 12-16, 2010).

Third Generation Partnership Project, "Technical Specification Group Radio Access Network; Multiplexing and channel coding (FDD) (Release 1999)," 3GPP TS 25.212 V3.11.0 (Sep. 2002).

Third Generation Partnership Project, "Technical Specification Group Radio Access Network; Multiplexing and channel coding (FDD) (Release 4)," 3GPP TS 25.212 V4.6.0 (Sep. 2002).

Third Generation Partnership Project, "Technical Specification Group Radio Access Network; Multiplexing and channel coding (FDD) (Release 5)," 3GPP TS 25.212 V5.10.0 (Jun. 2005).

Third Generation Partnership Project, "Technical Specification Group Radio Access Network; Multiplexing and channel coding (FDD) (Release 6)," 3GPP TS 25.212 V6.10.0 (Dec. 2006).

Third Generation Partnership Project, "Technical Specification Group Radio Access Network; Multiplexing and channel coding (FDD) (Release 7)," 3GPP TS 25.212 V7.11.0 (Sep. 2009).

Third Generation Partnership Project, "Technical Specification Group Radio Access Network; Multiplexing and channel coding (FDD) (Release 8)," 3GPP TS 25.212 V8.6.0 (Sep. 2009).

Third Generation Partnership Project, "Technical Specification Group Radio Access Network; Multiplexing and channel coding (FDD) (Release 8)," 3GPP TS 25.212 V8.7.0 (Mar. 2012).

Third Generation Partnership Project, "Technical Specification Group Radio Access Network; Multiplexing and channel coding (FDD) (Release 9)," 3GPP TS 25.212 V9.2.0 (Mar. 2010).

Third Generation Partnership Project, "Technical Specification Group Radio Access Network; Multiplexing and channel coding (FDD) (Release 9)," 3GPP TS 25.212 V9.5.0 (Mar. 2012).

Third Generation Partnership Project, "Technical Specification Group Radio Access Network; Multiplexing and channel coding (FDD) (Release 10)," 3GPP TS 25.212 V10.3.0 (Sep. 2012).

Third Generation Partnership Project, "Technical Specification Group Radio Access Network; Multiplexing and channel coding (FDD) (Release 11)," 3GPP TS 25.212 V11.3.0 (Sep. 2012).

Third Generation Partnership Project, "Technical Specification Group Radio Access Network; Multiplexing and channel coding (FDD) (Release 1999)," 3GPP TS 25.214 V3.12.0 (Mar. 2003).

Third Generation Partnership Project, "Technical Specification Group Radio Access Network; Physical layer procedures (FDD) (Release 4)," 3GPP TS 25.214 V4.6.0 (Mar. 2003).

Third Generation Partnership Project, "Technical Specification Group Radio Access Network; Physical layer procedures (FDD) (Release 5)," 3GPP TS 25.214 V5.11.0 (Jun. 2005).

Third Generation Partnership Project, "Technical Specification Group Radio Access Network; Physical layer procedures (FDD) (Release 6)," 3GPP TS 25.214 V6.11.0 (Dec. 2006).

Third Generation Partnership Project, "Technical Specification Group Radio Access Network; Physical layer procedures (FDD) (Release 7)," 3GPP TS 25.214 V7.15.0 (Mar. 2010).

Third Generation Partnership Project, "Technical Specification Group Radio Access Network; Physical layer procedures (FDD) (Release 7)," 3GPP TS 25.214 V7.17.0 (Dec. 2010).

Third Generation Partnership Project, "Technical Specification Group Radio Access Network; Physical layer procedures (FDD) (Release 8)," 3GPP TS 25.214 V8.9.0 (Mar. 2010).

Third Generation Partnership Project, "Technical Specification Group Radio Access Network; Physical layer procedures (FDD) (Release 8)," 3GPP TS 25.214 V8.13.0 (Mar. 2012).

Third Generation Partnership Project, "Technical Specification Group Radio Access Network; Physical layer procedures (FDD) (Release 9)," 3GPP TS 25.214 V9.2.0 (Mar. 2010).

Third Generation Partnership Project, "Technical Specification Group Radio Access Network; Physical layer procedures (FDD) (Release 9)," 3GPP TS 25.214 V9.8.0 (Mar. 2012).

Third Generation Partnership Project, "Technical Specification Group Radio Access Network; Physical layer procedures (FDD) (Release 10)," 3GPP TS 25.214 V10.6.0 (Mar. 2012).

Third Generation Partnership Project, "Technical Specification Group Radio Access Network; Physical layer procedures (FDD) (Release 11)," 3GPP TS 25.214 V11.3.0 (Sep. 2012).

Third Generation Partnership Project, "Technical Specification Group Radio Access Network; Medium Access Control (MAC) protocol specification (Release 1999)," 3GPP TS 25.321 V3.17.0 (Jun. 2004).

Third Generation Partnership Project, "Technical Specification Group Radio Access Network; Medium Access Control (MAC) protocol specification (Release 4)," 3GPP TS 25.321 V4.10.0 (Jun. 2004).

Third Generation Partnership Project, "Technical Specification Group Radio Access Network; Medium Access Control (MAC) protocol specification (Release 5)," 3GPP TS 25.321 V5.14.0 (Sep. 2008).

Third Generation Partnership Project, "Technical Specification Group Radio Access Network; Medium Access Control (MAC) protocol specification (Release 6)," 3GPP TS 25.321 V6.18.0 (Mar. 2009).

Third Generation Partnership Project, "Technical Specification Group Radio Access Network; Medium Access Control (MAC) protocol specification (Release 7)," 3GPP TS 25.321 V7.16.0 (Mar. 2010).

Third Generation Partnership Project, "Technical Specification Group Radio Access Network; Medium Access Control (MAC) protocol specification (Release 7)," 3GPP TS 25.321 V7.19.0 (Dec. 2010).

Third Generation Partnership Project, "Technical Specification Group Radio Access Network; Medium Access Control (MAC) protocol specification (Release 8)," 3GPP TS 25.321 V8.9.0 (Mar. 2010).

Third Generation Partnership Project, "Technical Specification Group Radio Access Network; Medium Access Control (MAC) protocol specification (Release 8)," 3GPP TS 25.321 V8.16.0 (Sep. 2012).

(56) References Cited

OTHER PUBLICATIONS

Third Generation Partnership Project, "Technical Specification Group Radio Access Network; Medium Access Control (MAC) protocol specification (Release 9)," 3GPP TS 25.321 V9.2.0 (Mar. 2010).

Third Generation Partnership Project, "Technical Specification Group Radio Access Network; Medium Access Control (MAC) protocol specification (Release 9)," 3GPP TS 25.321 V9.9.0 (Sep. 2012).

Third Generation Partnership Project, "Technical Specification Group Radio Access Network; Medium Access Control (MAC) protocol specification (Release 10)," 3GPP TS 25.321 V10.7.0 (Sep. 2012).

Third Generation Partnership Project, "Technical Specification Group Radio Access Network; Medium Access Control (MAC) protocol specification (Release 11)," 3GPP TS 25.321 V11.2.0 (Sep. 2012).

Texas Instruments, "Multiplexing of UE Identities in the Shared Control Channel of EUTRA Downlink," 3GPP TSG RAN WG1 Ad Hoc on LTE, R1-060064, Helsinki, EU (Jan. 23-25, 2006).

\* cited by examiner

METHOD FOR MULTIPLEXING DATA FOR MULTIPLE WIRELESS TRANSMIT/RECEIVE UNITS FOR HIGH SPEED DOWNLINK CHANNELS

CROSS REFERENCE TO RELATED APPLICATIONS

This application claims priority to International Application No. PCT/US2011/034787 filed on May 2, 2011, which claims the benefit of U.S. Provisional Patent Application Nos. 61/329,669 filed Apr. 30, 2010 and 61/329,996 filed Apr. 30, 2010, the contents of which are hereby incorporated by reference herein.

BACKGROUND

Communication systems using multiple antennas at both the transmitter and the receiver have been developed. Systems that utilize multiple transmit and receive antennas may be referred to as multiple-input multiple-output (MIMO) systems. The multi-antenna configurations may be utilized to mitigate the negative effects of multipath and signal interference on signal reception. With the introduction of downlink MIMO, a wireless transmit/receive unit (WTRU) may receive multiple data streams simultaneously on the same frequency.

In high speed downlink packet access (HSDPA), downlink transmissions are scheduled by the Node B in a 2 ms transmission time interval (TTI) basis. In many cases there is not enough data for a single user to fully fill a 2 ms TTI. Internet traffic studies have shown that quite a large number of packets are in the order of 2 or 4 kbits, topped with the downlink traffic for cases like signaling radio bearer (SRB), voice over IP (VoIP) or transmission control protocol/Internet protocol (TCP/IP) acknowledgements for uplink traffic.

SUMMARY

Method and apparatus for multiplexing data for multiple wireless transmit/receive units (WTRUs) for high speed downlink channels are disclosed. A WTRU may receive a joint high speed shared control channel (HS-SCCH) including a common part and WTRU-specific parts. The common part includes common control information for WTRUs multiplexed in one transmission time interval (TTI), and each of the WTRU-specific parts includes WTRU-specific control information for a corresponding WTRU. The WTRU receives a high speed physical downlink shared channel (HS-PDSCH) based on decoding on the joint HS-SCCH.

In case data for multiple WTRUs are multiplexed into one medium access control (MAC) protocol data unit (PDU), the HS-SCCH may include a group WTRU identity shared by a group of WTRUs. The WTRU may receive an HS-PDSCH based on decoding on the HS-SCCH with the group WTRU identity, and retrieve a MAC payload from the MAC PDU based on corresponding control information in the MAC header on a condition that a dedicated WTRU identity is detected in the MAC header.

BRIEF DESCRIPTION OF THE DRAWINGS

A more detailed understanding may be had from the following description, given by way of example in conjunction with the accompanying drawings wherein.

DETAILED DESCRIPTION

The embodiments herein will be described with reference to the figures wherein like element numbers represent like elements throughout.

Figure 1A:
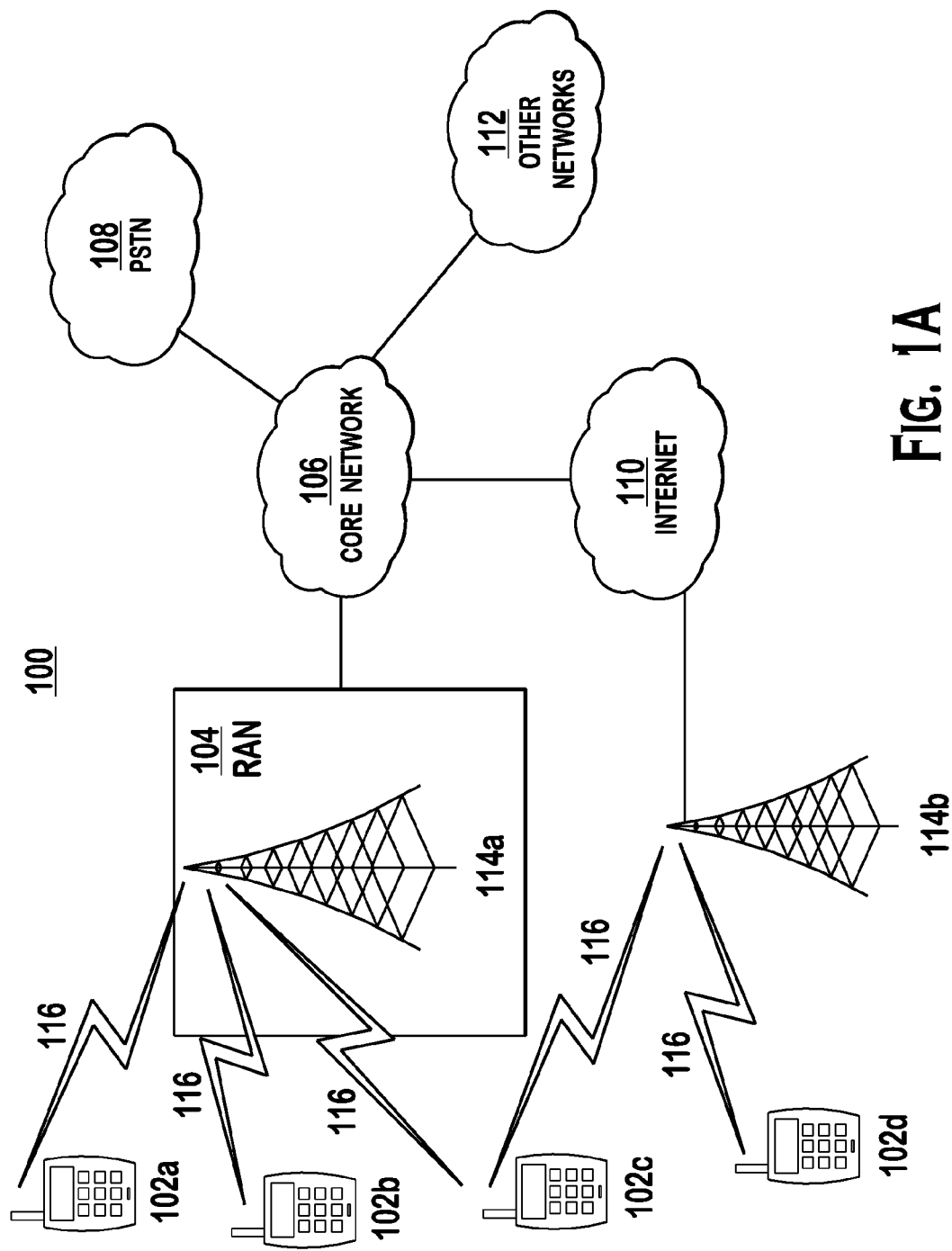
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN)

108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
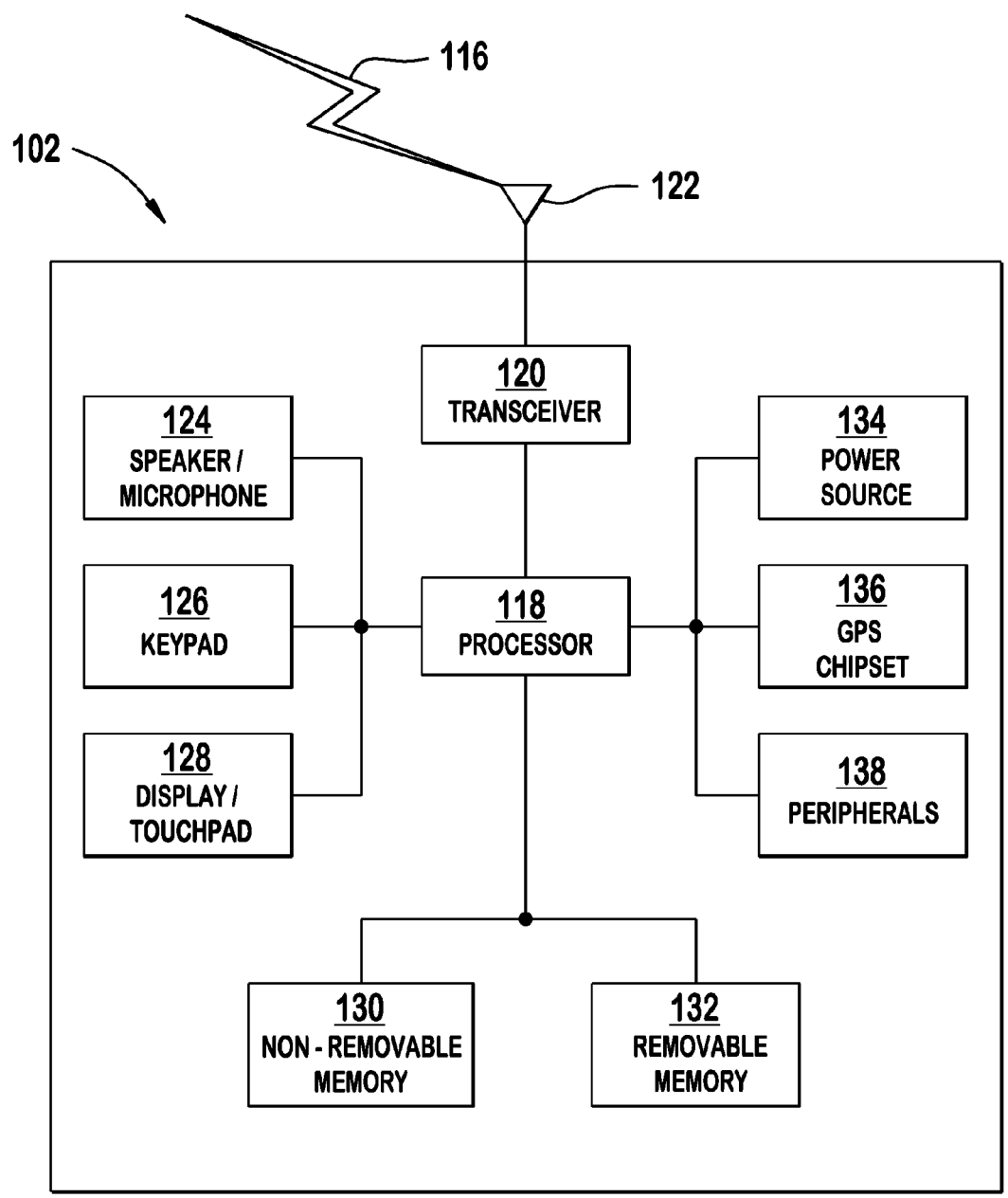
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
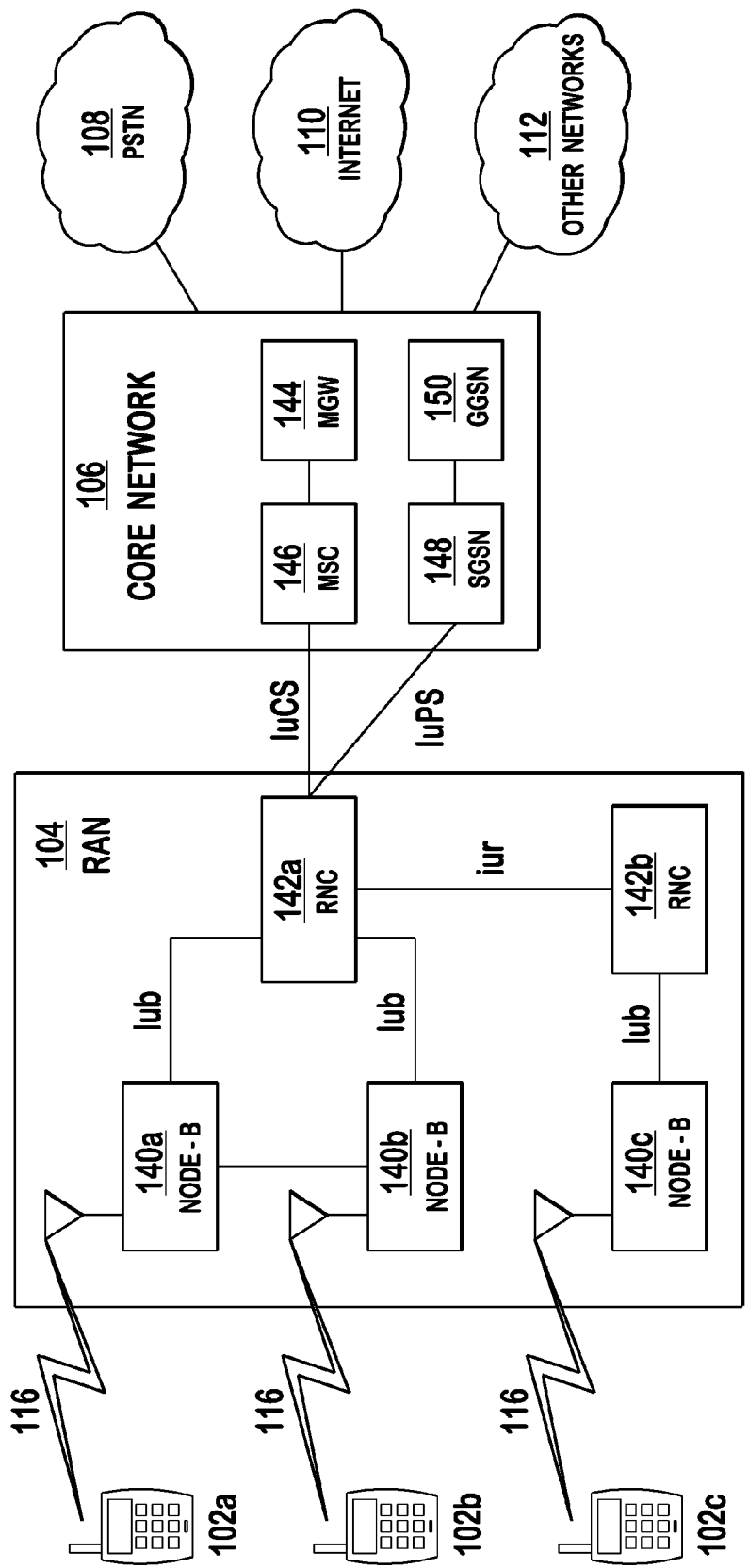
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

It should be noted that even though embodiments are described in the context of 3GPP UMTS wireless communications systems, the embodiments may be applied to any wireless communication systems, such as long term evolution (LTE), LTE Advanced, GPRS EDGE radio access network (GERAN) and WiMax, etc. It should be noted that the embodiments are described with reference to HS-DSCH and MAC-ehs, but the embodiments are applicable to any other types of transport channels and MAC entities. The embodiments disclosed herein may be used independently or in any combination.

HS-DSCH data for multiple WTRUs may be included in one MAC transport block, (e.g., MAC-ehs PDU). Before a transport block, (i.e., MAC-ehs PDU), is received on the HS-DSCH by the WTRU, the HS-SCCH which includes the demodulation and hybrid automatic repeat request (HARQ) information as well as the WTRU identity needs to be decoded (layer 1 addressing). If the WTRU identity on the HS-SCCH matches, the layer 1 forwards the transport block to the MAC layer. The MAC layer then determines which HS-DSCH data included in the MAC-ehs PDU belongs to the WTRU (layer 2 addressing).

Embodiments for layer 1 addressing, (i.e., identifying the WTRUs for the MAC-ehs PDU), are disclosed hereafter.

In one embodiment, a common WTRU identity shared by multiple WTRUs may be used for layer 1 addressing. The common WTRU identity may be a group WTRU identity. For example, a group HS-DSCH radio network temporary identity (H-RNTI) may be assigned to a group of WTRUs by the network, for example, via a radio resource control (RRC) configuration or reconfiguration message or via a layer 1 signaling, (e.g., HS-SCCH order). This group WTRU identity may be signaled via the HS-SCCH to indicate which WTRUs the MAC-ehs PDU is addressed to. If its assigned group WTRU identity is decoded on the HS-SCCH, the layer 1 receives the corresponding HS-DSCH and forwards the HS-DSCH transport block to the MAC layer.

Alternatively, the WTRU may be pre-configured with different group WTRU identities via RRC signaling and the network may dynamically change the group WTRU identity of the WTRU, (e.g., via an HS-SCCH order), by using an index into one of the group WTRU identities.

Alternatively, the WTRU may be provided with an additional WTRU identity, (called a multiplexing WTRU identity), in addition to a regular WTRU identity. For instance, a primary H-RNTI and a secondary H-RNTI may be assigned to a WTRU, where the secondary H-RNTI may be used for multiplexing multiple WTRUs in a TTI. The multiplexing WTRU identity may be signaled through the HS-SCCH in case the network multiplexes data for different WTRUs in one HS-DSCH transport block.

Alternatively, the WTRU may determine the group WTRU identity from the dedicated WTRU identity in accordance with a predetermined rule known by both the WTRU and the network. For example, the dedicated WTRU identity may be masked by a predetermined value to derive the group WTRU identity. For example, a group of WTRUs may share certain bits of their dedicated H-RNTIs, (e.g., 12 most significant bits (MSBs)). In this case, the WTRUs may determine their group H-RNTI by performing the logical operation: H-RNTI AND FFFOh.

In another embodiment, a new HS-SCCH format may be defined to indicate a list of WTRU identities, (e.g., H-RNTIs). For example, a list of WTRU identities for multiple WTRUs may be signaled via the HS-SCCH. For instance, in one example assuming 16 bits for each H-RNTI, the WTRU identity field may be extended for multiplexing two WTRUs as follows: $x_{wtru1,1}, x_{wtru2,2}, \ldots, x_{wtru1,16}, \ldots, x_{wtruk,1}, x_{wtruk,2}, \ldots, x_{wtruk,16}$. When decoding the HS-SCCH, the layer 1 determines which WTRUs the HS-DSCH data is addressed to from the list of WTRU identities included in the HS-SCCH and may forward the HS-DSCH transport block to the MAC layer if its own WTRU identity is included in the list of WTRU identities. Alternatively, the WTRU may be addressed by means of having one common WTRU identity that may be used in the HS-SCCH and an index to a WTRU in the group that may uniquely identify the WTRU which is being scheduled. A list of indices of all multiplexed WTRUs may be provided in the HS-SCCH.

The number of WTRUs that may be addressed in the same HS-DSCH transport block may be predefined, (e.g., two WTRUs). This number may be configured at the RRC or layer 1 level.

Alternatively, the number of WTRUs that are addressed in the same HS-DSCH transport block may be dynamically changed. There may be a maximum number of WTRUs that may be addressed simultaneously. The layer 1 determines how many WTRU identities are present in the HS-SCCH in accordance with one or a combination of the following embodiments.

An additional field may be included in the HS-SCCH to indicate how many WTRU identities are included in the HS-SCCH. The layer 1 may decode the corresponding number of bits in the HS-SCCH in accordance with the additional field and may ignore the rest of the WTRU address bits. For example, if maximum three WTRUs may be addressed at the same time and the network multiplexes data for two WTRUs in one HS-DSCH transport block and therefore sets the additional field to indicate two WTRUs are multiplexed, the layer 1 may decode 32 bits (assuming 16 bits of WTRU identity) and discard the remaining 16 bits. Alternatively, certain values of the H-RNTI, (e.g., all zeros or all ones), may be reserved to indicate that this is not a valid H-RNTI. Depending on the number of valid H-RNTIs decoded, the layer 1 may determine the number of WTRUs being addressed.

Embodiments for layer 2 addressing, (i.e., identifying the WTRUs for each of the HS-DSCH data included in the MAC-ehs PDU), are disclosed hereafter. In order to address multiple WTRUs in the same transport block, the MAC-ehs PDU header may include new fields so that the MAC entity may extract its own payload.

In accordance with one embodiment, the MAC-ehs header may include one or more WTRU identities for each HS-DSCH data multiplexed in the HS-DSCH transport block. The WTRU identities may be added in the same order that the MAC-ehs payloads are concatenated in the MAC-ehs PDU. More specifically, if WTRU ID1 appears first in the MAC-ehs header, then the corresponding reordering PDU(s) or MAC-ehs payload for UE1 may be concatenated first in the MAC-ehs PDU, and so on.

The WTRU ID used for layer 2 addressing to identify the WTRU for each HS-DSCH payload included in the MAC transport block may be the H-RNTI of the WTRU, the primary E-DCH radio network temporary identity (E-RNTI) of the WTRU, or any other types of WTRU identity. Alternatively, the WTRU ID for layer 2 addressing may be a subset of the H-RNTI or any WTRU identity. In case a certain number of bits of the WTRU identity are common among several WTRUs and used for layer 1 addressing, the remaining bits are unique for each WTRU and may be used for layer 2 addressing for each HS-DSCH payload multiplexed in the HS-DSCH transport block. A logical AND operation between the WTRU identity and a mask may be performed to obtain this subset of dedicated bits for layer 2 addressing. For instance, in case 12 bits of WTRU identity are common and 4 bits are unique to each WTRU, the logical operation may be as follows: WTRU Identity AND 000Fh.

Alternatively, each WTRU within a group may be assigned an identity or an index number. This identity may require less bits than the H-RNTI, (e.g., if 16 or 8 WTRUs may be included in one group, 4 or 3 bits, respectively, may be used to uniquely identify the WTRUs in the group). This will reduce the overhead associated to addressing the WTRUs in the MAC header. This WTRU ID may be signaled to the WTRU as part of the RRC configuration or alternatively, a predefined rule may be used.

The index may take a value equal to the number of WTRUs being addressed in the same transport block. For instance, if three WTRUs are addressed, the index may take the values 0, 1, or 2. Layer 1 may determine, and provide, the index number to the MAC layer. For example, if layer 1 decodes the WTRU identity at the n-th place, layer 1 may indicate index 'n' to the MAC layer. Alternatively, the network may use different HS-SCCHs configured for a WTRU to indicate this index. Conventionally, up to four HS-SCCHs may be configured per carrier for a WTRU. The index may be determined based on the HS-SCCH number that the WTRU decodes its group WTRU identity or individual WTRU identity. For instance, if HS-SCCH1 is used, the WTRU may use the index1, if HS-SCCH2 is used, the WTRU may use index2, and so on. Alternatively, in case where data for two WTRUs are multiplexed in one HS-DSCH transport block, the parity of the HS-SCCH may be used to indicate which index to use to extract its MAC-ehs payload. For instance, if the HS-SCCH used is an odd number, the WTRU may use index1, while if the HS-SCCH used is an even number, the WTRU may use index2, or vice-versa.

It should be understood that even though the WTRU addressing is described as part of layer 2 addressing, they may be equally applicable for layer 1 addressing.

Figure 2:
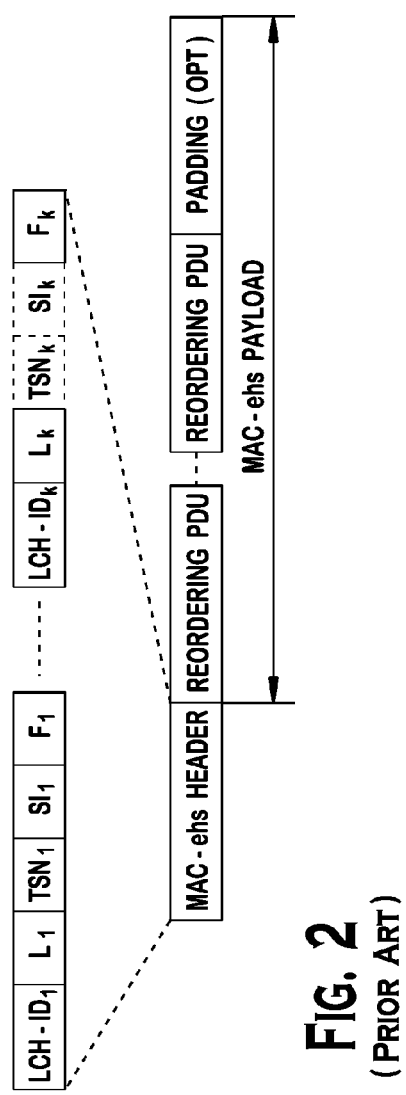
FIG. 2 is a conventional MAC-ehs PDU format.

FIG. 2 is a conventional MAC-ehs PDU format. A MAC-ehs PDU includes an MAC-ehs header and an MAC-ehs payload. The MAC-ehs header includes extraction information for the payload. The MAC-ehs payload may include one or multiple reordering PDUs. Each reordering PDU may include complete or segmented reordering service data units (SDUs). The MAC-ehs header includes one or more sets of logical channel identity (LCH-ID), length (L), transmission sequence number (TSN), segmentation information (SI), and flag (F) fields. The LCH-ID and L fields are repeated per reordering SDU. The TSN and SI fields are repeated per reordering PDU. The LCH-ID field in the MAC-ehs header indicates to which logical channel each reordering SDU belongs to. The L field indicates the length in bytes of each reordering SDU. The TSN field and the SI field indicates if and how the reordering PDU has been segmented in multiple reordering SDUs. The flag F indicates if it is the end of the MAC-header or if the next field is another LCH-ID. The presence of the $TSN_i$ and $SI_i$ fields is based on the value of the $LCH-ID_i$. If the $LCH-ID_1$ is mapped to the same reordering queue as $LCH-ID_{i-1}$ or if the value of $LCH-ID_{i-1}$ is equal to the value of $LCH-ID_i$, there is no $TSN_i$ or $SI_i$ field. The mapping of the LCH-ID to the reordering queue is provided by upper layers.

Embodiments for MAC-ehs PDU and MAC-ehs header format are disclosed hereafter.

In one embodiment, the reordering PDUs belonging to one WTRU may be arranged in the MAC-ehs PDU consecutively and one MAC-ehs header at the beginning of the MAC-ehs PDU may include field(s) indicating which reordering PDU(s) belong to which WTRU. The MAC-ehs header may include a WTRU address field, a length field indicating the length of the WTRU MAC-ehs payload or the number of reordering PDUs, and a flag(s).

In one embodiment, each set of LCH-ID and L fields may be followed by a flag (FLAG), (e.g., one-bit flag), which indicates whether the following field is a WTRU address field (WTRU-ID) or an LCH-ID field. For example, if FLAG is set to '1', the next field is a WTRU address field (WTRU-ID), and if FLAG is set to '0', the next fields are a new set of LCH-ID and L fields corresponding to the same WTRU or it is the end of the MAC-ehs PDU. In case the TSN and SI fields are present, this new flag may be added after the SI field. Alternatively, the WTRU-ID and FLAG may be included in any location in the MAC-ehs header.

The WTRU needs to distinguish between the end of one WTRU MAC-ehs payload and the end of the MAC-ehs header. The MAC layer may know the number of WTRUs in advance via layer 1, or a new field may be added in the MAC-ehs header to indicate the number of WTRUs multiplexed in the MAC-ehs PDU. Alternatively, instead of a one-bit flag (FLAG), a two-bit flag may be used to indicate whether the next field is a WTRU address, an LCH-ID, or the end of the MAC-ehs header (or alternatively, a field F).

Alternatively, the MAC-ehs header may include WTRU address fields (WTRU-$ID_1$) and a length field ($L_{UE}$) indicating the number of bits or bytes of data belonging to each WTRU. A one-bit flag may be added at the end of each set of WTRU address and $L_{UE}$ fields to indicate whether the following field is a new set of WTRU-ID and $L_{UE}$ fields or there is no more WTRU being addressed. The number of multiplexed WTRUs may be fixed and may not be signaled via the MAC-ehs header. Alternatively, the number of multiplexed WTRUs may vary and the MAC-ehs header may include an N field indicating the number of WTRUs multiplexed in the MAC-ehs PDU. Alternatively, the number of multiplexed WTRUs may be signaled via the HS-SCCH. Layer 1 may determine the number of WTRUs and forwards this number to the MAC layer.

Alternatively, the length of the data for each WTRU may be one of predefined numbers, that may be configurable, and it may be indicated in the HS-SCCH. Alternatively, the length of the data for each WTRU may correspond to all or a subset of values of the transport block table and the $L_{UE}$ field may correspond to an index of the entries of the transport block table. Alternatively, the number of reordering PDUs may be indicated for each WTRU instead of a length $L_{UE}$.

Alternatively, one WTRU address field may be added in the MAC-ehs header per reordering PDU. A new flag may be added after each LCH-ID and L fields to indicate whether the following field is the LCH-ID or WTRU address. Alternatively, a new flag may be added after the LCH-ID and L fields in case the LCH-ID value is different from the previous one. The flag may be added after the first LCH-ID and L fields. This flag may indicate to the MAC layer if the next field is a WTRU address field or an LCH-ID field. The same value of the WTRU address field may be repeated.

Alternatively, one WTRU address may be added in the MAC-ehs header per reordering SDU, which means that one WTRU address field is added after each LCH-ID and L fields. In this case, no new flag may be required since the MAC layer may expect a WTRU address field after each set of LCH-ID and L fields, or TSN (if present) and SI (if present) fields. Alternatively, the WTRU address field may be added before the LCH-ID field.

Figure 3:
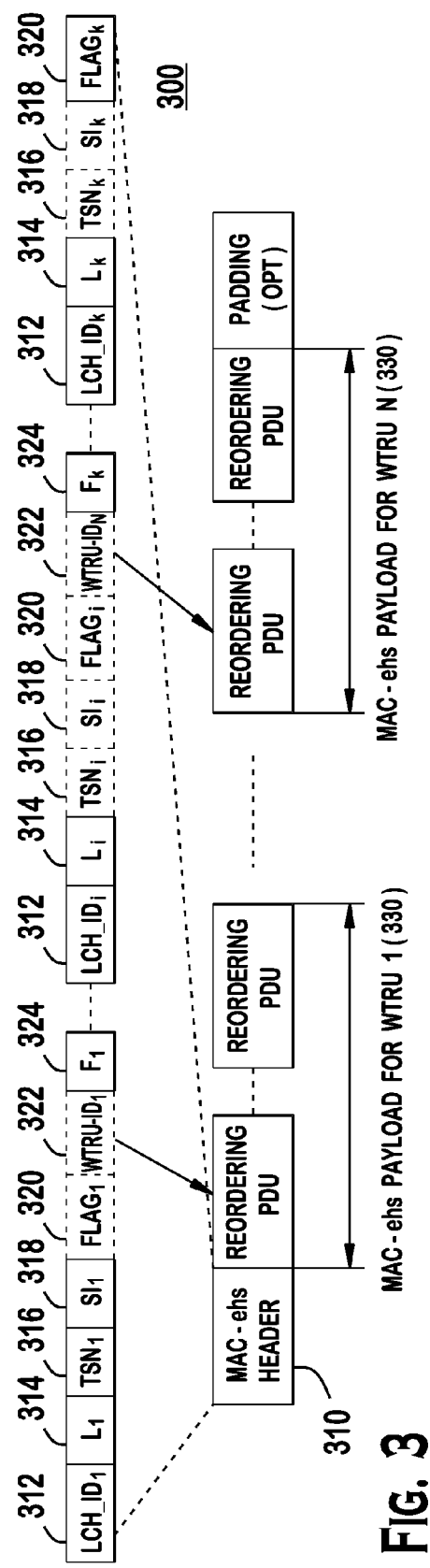
FIG. 3 is an example MAC-ehs PDU format in one embodiment.

FIG. 3 is an example MAC-ehs PDU format in one embodiment. The MAC-ehs PDU 300 includes an MAC-ehs header 310 and MAC-ehs payloads 330 for a plurality of WTRUs. The MAC-ehs header 310 includes an LCH-ID field 312, L field 314, TSN field 316, SI field 318, FLAG 320, WTRU ID 322, and F field 324. The MAC-ehs payload 320 includes reordering PDUs for a plurality of WTRUs. FLAG 320 and WTRU-ID 322 are added in the MAC-ehs header 310 after the set of LCH-ID 312, L 314, TSN 316 and S1318, (or LCH-ID and L fields if TSN and SI field are not present). The FLAG field 320 may be added per reordering SDU to indicate if the next field is a new WTRU-ID or a new LCH-ID. The WTRU-ID field 322 is added per WTRU payload, (i.e., the number of WTRU-ID fields correspond to the number of multiplexed WTRUs in the MAC-ehs PDU). To extract its payload, the MAC layer compares the WTRU-ID field to its own WTRU identity, and if they match, the MAC layer extracts the reordering PDUs as long as the field FLAG 320 indicates the next field is not a new WTRU-ID. If the field FLAG 320 indicates that the next field is another WTRU-ID, the MAC layer stops extracting the corresponding reordering PDUs.

Figure 4:
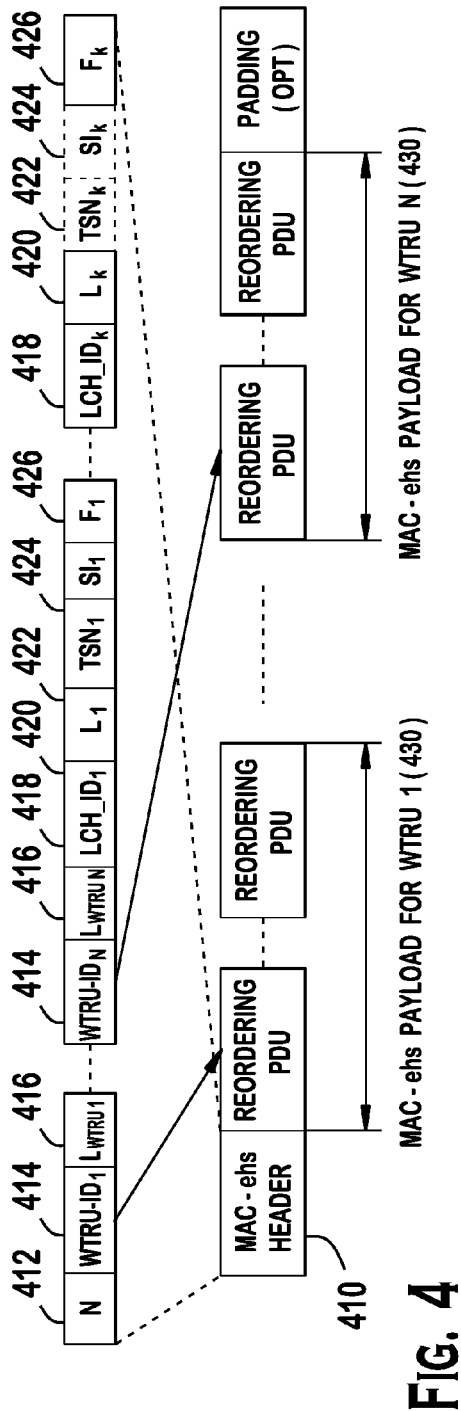
FIG. 4 shows another example MAC-ehs PDU format in another embodiment.

FIG. 4 shows another example MAC-ehs PDU format in another embodiment. The MAC-ehs PDU 400 includes an MAC-ehs header 410 and a payload 430. The MAC-ehs header 410 includes an N field 412, WTRU-ID fields 414, $L_{UE}$ fields 416, an LCH-ID field 418, L field 420, TSN field 422, SI field 424, and F field 426. The payload 430 includes reordering PDUs for a plurality of WTRUs. The N field 412 indicates the number of multiplexed WTRUs in the MAC-ehs PDU. The list of WTRU-IDs 414 and $L_{UE}$ fields 416 (indicating the length of each WTRU payload) may be added at the beginning of the MAC-ehs header. To extract its payload, the MAC layer reads the fields in the header and stores each $L_{UE}$ until if finds its own WTRU-ID. The MAC layer continues to read the header and adds up the L fields it encounters until it reaches the length of the WTRU payloads preceding its own payload (using the $L_{UE}$ fields of the preceding WTRUs). The MAC layer then extracts its payload, knowing its own $L_{UE}$ length.

In another embodiment, a MAC-ehs header may be added before each MAC-ehs payload for WTRU. This MAC-ehs header may include the WTRU address, (e.g., WTRU identity, sub-identity, index, or the like). Alternatively, no new field may be added in each MAC-ehs header and the MAC layer may determine in which position its own MAC-ehs header is based on an indication from layer 1.

Figure 5:
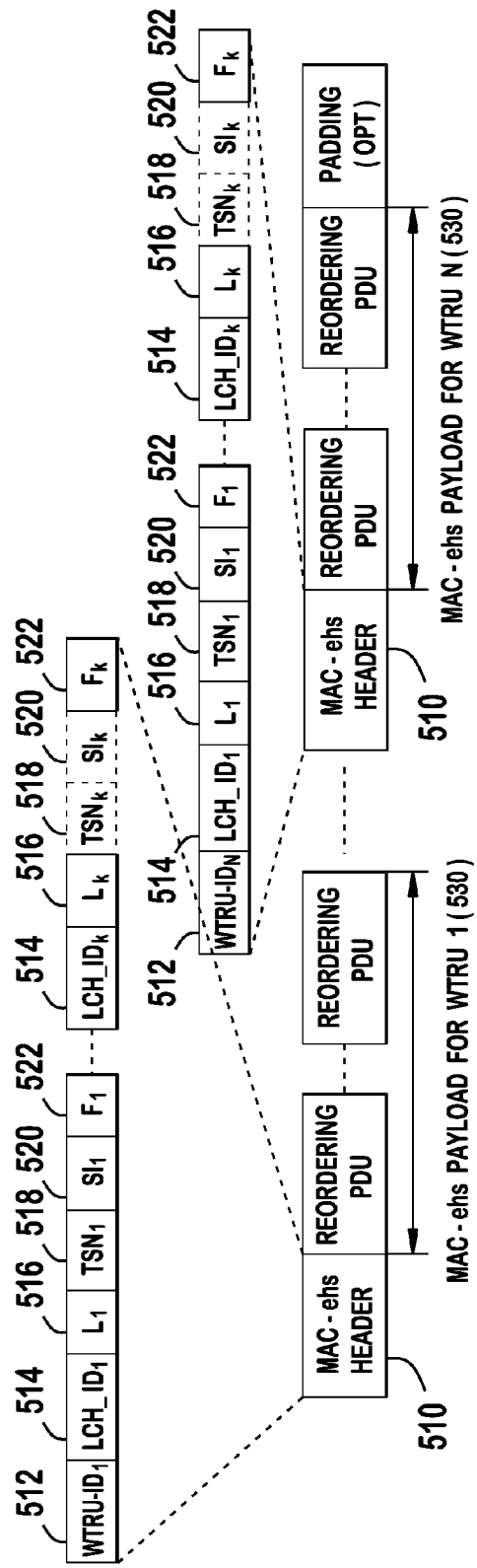
FIG. 5 shows an example MAC-ehs PDU and MAC-ehs header format in one embodiment.

FIG. 5 shows an example MAC-ehs PDU and MAC-ehs header format in one embodiment. In this example, a MAC-ehs header 510 is added to an MAC-ehs payload 530 for each WTRU. Each MAC-ehs header 510 includes an WTRU-ID field 512, an LCH-ID field 514, an L field 516, a TSN field 518, an SI field 520, and an F field 522. The WTRU-ID field 512 indicates to which WTRU the following MAC-ehs payload belongs. The MAC layer reads the MAC-ehs header 510 until it finds its own WTRU-ID, and then extracts its payload. Padding bits may be added at the end the MAC-ehs PDU, or alternatively at the end of each MAC-ehs payload.

In another embodiment, individual WTRU MAC-ehs PDUs (including payload and header) are first created for the WTRUs that are multiplexed in the MAC-ehs transport block, and the individual WTRU MAC-ehs PDUs are multiplexed into a final MAC-ehs PDU. A final MAC-ehs PDU header may be added to each individual WTRU MAC-ehs PDU. On the WTRU side, the WTRU de-multiplexes the individual WTRU MAC-ehs PDUs based on the final MAC-ehs PDU headers. If the WTRU determines that one of the individual WTRU MAC-ehs PDUs is addressed to itself, the WTRU may disassemble that individual WTRU MAC-ehs PDU for further processing, and may discard other individual WTRU MAC-ehs PDUs.

Figure 6:
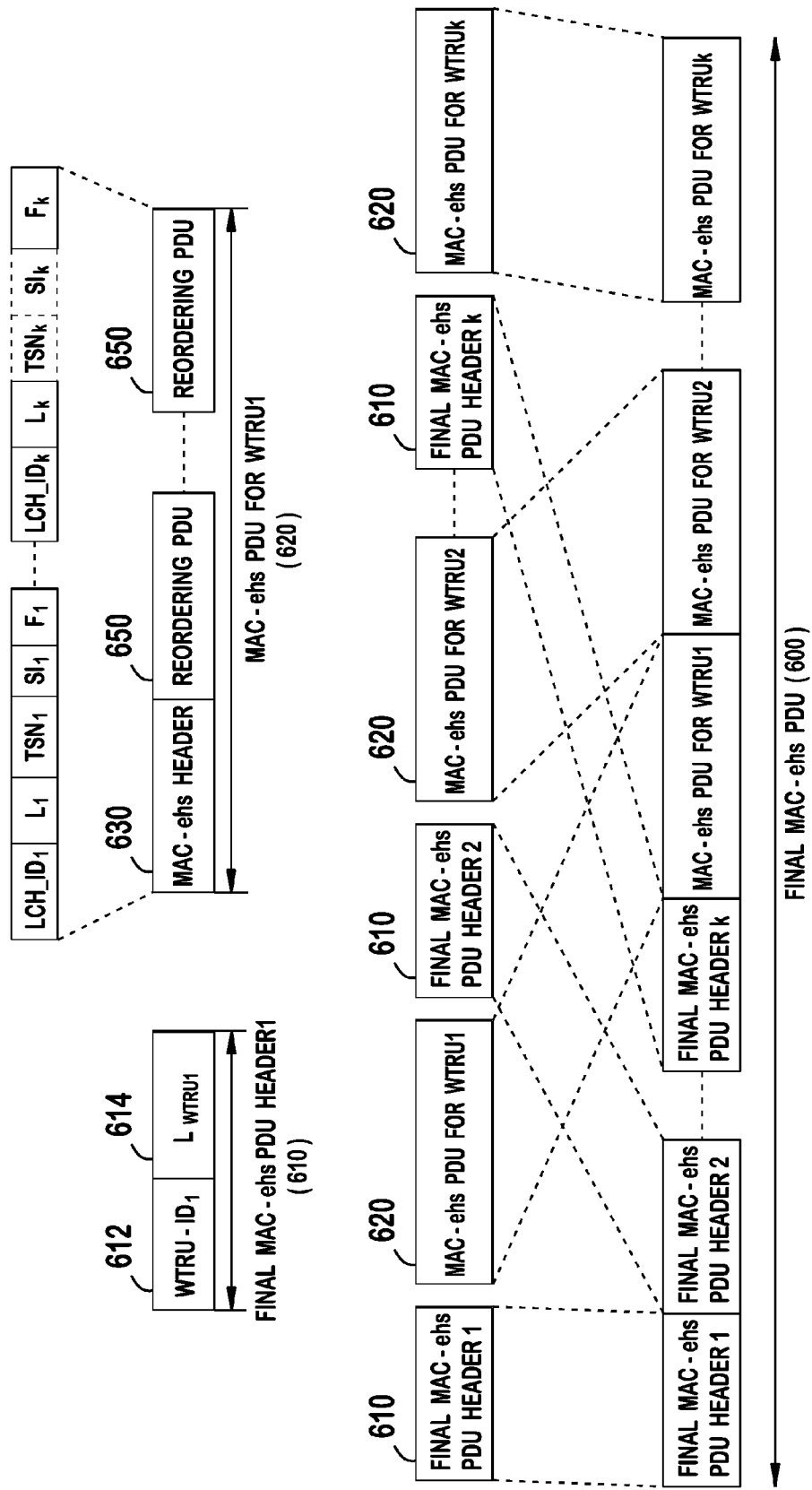
FIG. 6 shows an example final MAC-ehs PDU format in one embodiment.

FIG. 6 shows an example final MAC-ehs PDU format in one embodiment. The final MAC-ehs PDU 600 includes final MAC-ehs PDU headers 610 and individual WTRU MAC-ehs PDUs 620. The final MAC-ehs PDU headers 610 may be arranged at the beginning of the final MAC-ehs PDU 600. The individual WTRU MAC-ehs PDU 620 includes an MAC-ehs header 630 and reordering PDUs 650 for each WTRU.

The final MAC-ehs PDU header 610 for each individual WTRU MAC-ehs PDU may include an WTRU identity (WTRU-ID) 612, and a length field ($L_{UEx}$) 614 indicating the length of the individual WTRU MAC-ehs PDU 620 for UEx. The length may be expressed in units of bytes or bits, or alternatively may correspond to an index to a pre-defined set of MAC-ehs PDU sizes, (e.g., all or subset of transport block table). The length field is used to de-multiplex the individual WTRU MAC-ehs PDUs.

The final MAC-ehs PDU header 610 may include a flag (not shown), (e.g., at the end of each final MAC-ehs PDU header), to indicate whether this is the end of the final MAC-ehs PDU header 610 or a more WTRU ID or $L_{UE}$ follows. The final MAC-ehs PDU header 610 may include a field (not shown) to indicate how many individual WTRU MAC-ehs PDUs are multiplexed together in the final MAC-ehs PDU 600. For example, an N field may be added in the final MAC-ehs PDU header 610. Alternatively, the L field may signal this value to the WTRU. Alternatively, the number of multiplexed WTRUs may be predetermined and known to the WTRU.

Alternatively, the HS-SCCH may indicate the individual WTRU MAC-ehs PDU size in the final MAC-ehs PDU. In this case, the $L_{UE}$ field may not be present in the final MAC-ehs header. The WTRU retrieves the multiplexed individual WTRU MAC-ehs PDU size over the HS-SCCH and together with the WTRU ID in the final MAC-ehs PDU header, and de-multiplexes the individual WTRU MAC-ehs PDU that belongs to the WTRU and discards other individual WTRU MAC-ehs PDUs.

Alternatively, the de-multiplexing information that is required by the MAC layer to extract its own reordering PDUs may be indicated in the HS-SCCH, which is forwarded by layer 1. This information may include the length of each MAC-ehs payload per WTRU, (or the transport block size for each individual WTRU MAC-ehs PDU), or the number of MAC-ehs reordering PDUs per WTRU. Layer 1 may extract the de-multiplexing information addressed to the WTRU and pass it to the MAC layer, or may pass to the MAC layer the de-multiplexing information addressed to the WTRUs. Alternatively, the size of the payload corresponding to each WTRU may be predefined, (e.g., it may be the total transport block size or total payload divided by the number of WTRUs).

The MAC layer determines which MAC header or PDU format to use. If the WTRU has been assigned a group WTRU identity, (e.g., a group H-RNTI), or a multiplexing WTRU identity, (e.g., a secondary H-RNTI), and if layer 1 decodes this identity in the HS-SCCH, the MAC layer may process with the MAC header format for WTRU multiplexing. Alternatively, the same MAC-ehs format may be used regardless of the WTRU multiplexing. Alternatively, layer 1 may indicate to the MAC layer if more than one WTRU identity has been decoded in the HS-SCCH so that the MAC layer may use the correct MAC header format. Alternatively, the MAC header format may be part of an RRC configuration.

The network may use a different MAC-ehs PDU format depending on the type of the transmission. If it is a transmission for a single WTRU, it may use the conventional MAC-ehs format and if it is a transmission for multiple WTRUs with data multiplexed in one transport block, it may use the new format of the MAC-ehs PDU for multiplexing. Alternatively, the network may use the same format and the WTRU may determine if the data is multiplexed or not by detecting the number of WTRUs being addressed. The network may dynamically multiplex the data for a different number of WTRUs at different periods of time.

An HS-SCCH order may be used to explicitly enable the WTRU to start reception in this mode, (e.g., WTRUs are multiplexed and start re-interpreting the MAC or the HS-SCCH). The HS-SCCH order may contain specific information for the WTRU to use in order to start reception in this mode. For example, the HS-SCCH order may assign a WTRU index or WTRU ID to use to identify itself within the group. Alternatively, the HS-SCCH may provide the group ID to the WTRU.

Embodiments for the MAC-ehs architecture on the WTRU and on the UTRAN sides for supporting the multiplexing of WTRUs for HS-DSCH are disclosed hereafter.

Figure 7:
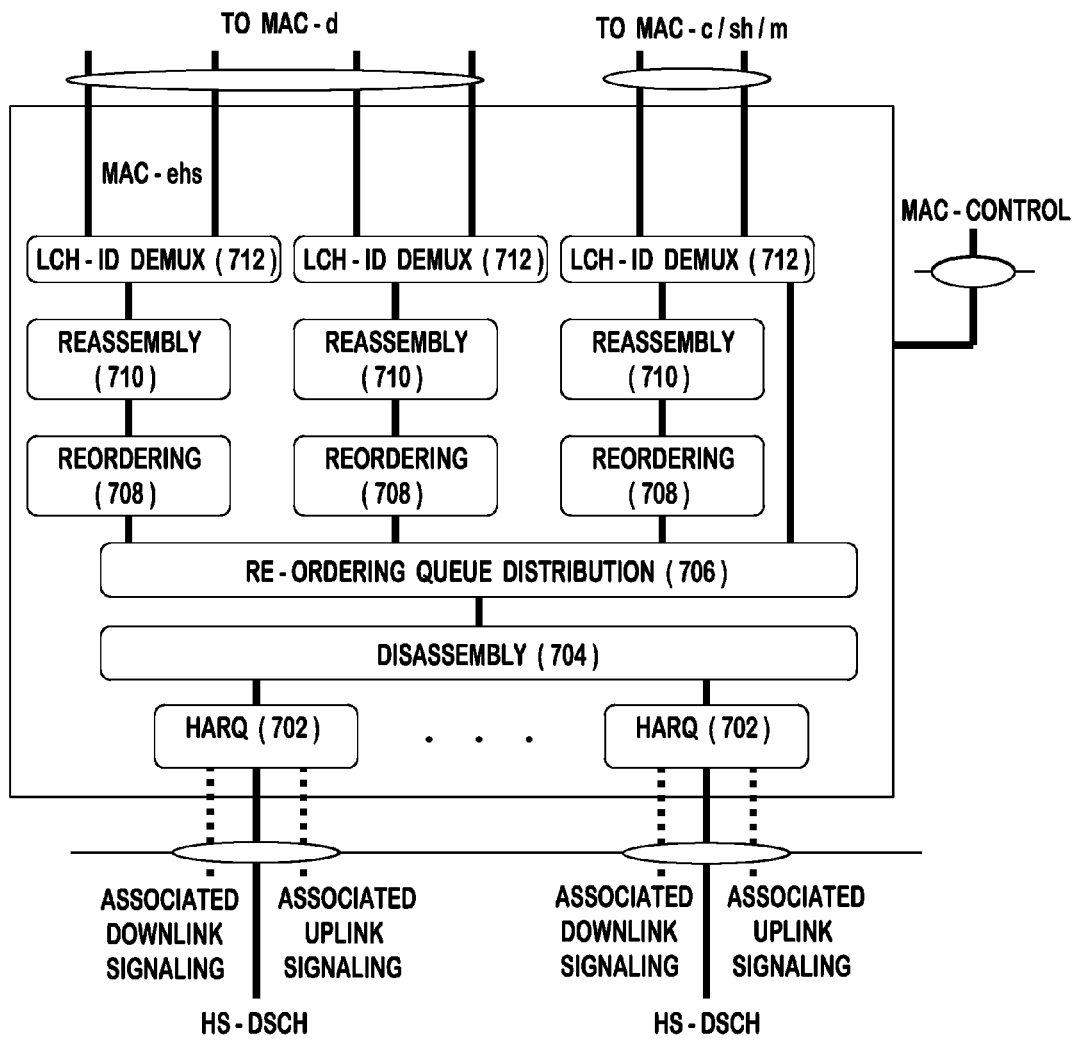
FIG. 7 shows an MAC-ehs entity on the WTRU side.

FIG. 7 shows an MAC-ehs entity on the WTRU side. The HARQ entity 702 is responsible for handling the HARQ protocol. The disassembly entity 704 disassembles the MAC-ehs PDUs by removing the MAC-ehs header and padding. The reordering queue distribution entity 706 routes the received reordering PDUs to correct reordering queues based on the received logical channel identifier. The reordering entity 708 organizes received reordering PDUs according to the received TSN. Data blocks with consecutive TSNs are delivered to the reassembly entity upon reception. The reassembly entity 710 reassembles segmented MAC-ehs SDUs and forwards the MAC PDUs to the LCH-ID de-multiplexing entity 712. The LCH-ID de-multiplexing entity 712 routes the MAC-ehs SDUs to correct logical channel based on the received logical channel identifier.

The disassembly entity 704 may perform additional processing to extract the reordering PDUs addressed to the WTRU and discard the rest of the reordering PDUs, and then deliver the reordering PDUs addressed to the WTRU to the reordering distribution entity. The additional processing performed by the disassembly entity may depend on the type of MAC-ehs format.

In case of a continuous MAC-ehs header as shown in FIG. 3, the disassembly entity 704 may find the WTRU address in the MAC-ehs header before extracting the MAC-ehs payload for this particular WTRU. In case where a MAC-ehs header is added before each MAC-ehs payload as shown in FIG. 4, the disassembly entity 704 may find the MAC-ehs header including its WTRU address before removing the headers, the padding bits and the reordering PDUs not addressed to this WTRU before delivering the reordering PDUs addressed to this WTRU to the reordering distribution entity. In case no change to the MAC-ehs header has been implemented, the disassembly entity 704 may use the de-multiplexing information provided by layer1 and/or implicit rules before extracting the reordering PDUs addressed to the WTRU. De-multiplexing information may include number of WTRUs multiplexed, length of each MAC-ehs payload, etc.

Figure 8:
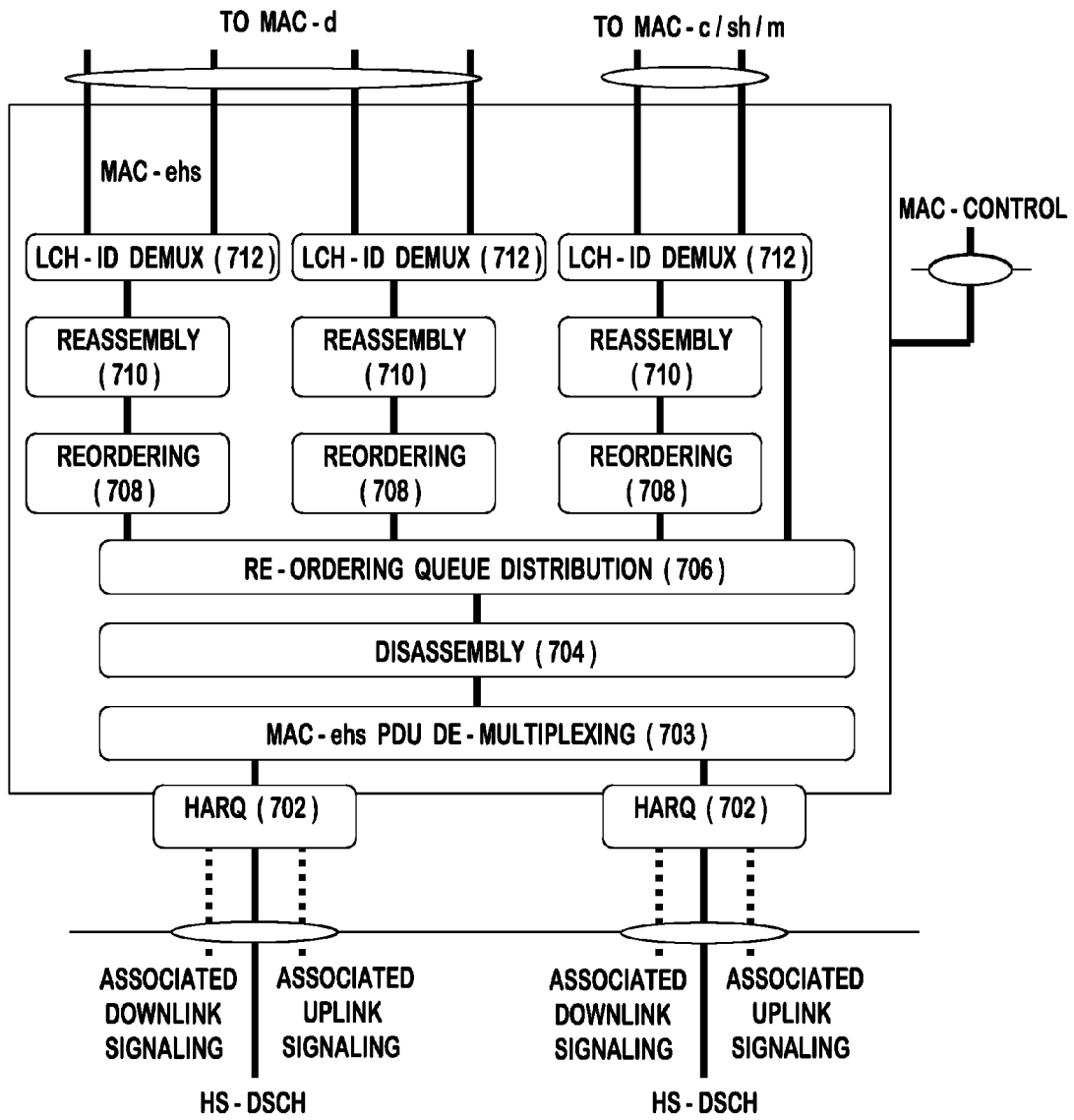
FIG. 8 shows an example MAC-ehs entity on the WTRU side supporting MAC-ehs PDU multiplexing in case individual WTRU MAC-ehs PDUs are multiplexed into a final MAC-ehs PDU.

FIG. 8 shows an example MAC-ehs entity on the WTRU side supporting MAC-ehs PDU multiplexing in case individual WTRU MAC-ehs PDUs are multiplexed into a final MAC-ehs PDU. The MAC-ehs PDU de-multiplexing entity 703 is introduced to de-multiplex the individual WTRU MAC-ehs PDUs and forward its own data to the disassembly entity 704. The MAC-ehs PDU de-multiplexing entity 703 may use the WTRU ID or index to determine which individual WTRU MAC-ehs PDU belongs to the WTRU, and forward it to the disassembly entity 704. The MAC-ehs PDU de-multiplexing entity 703 may discard the MAC-ehs PDU(s) that do not belong to this WTRU.

It should be noted that the functionality of the MAC-ehs PDU de-multiplexing entity may be included in the disassembly entity.

Figure 9:
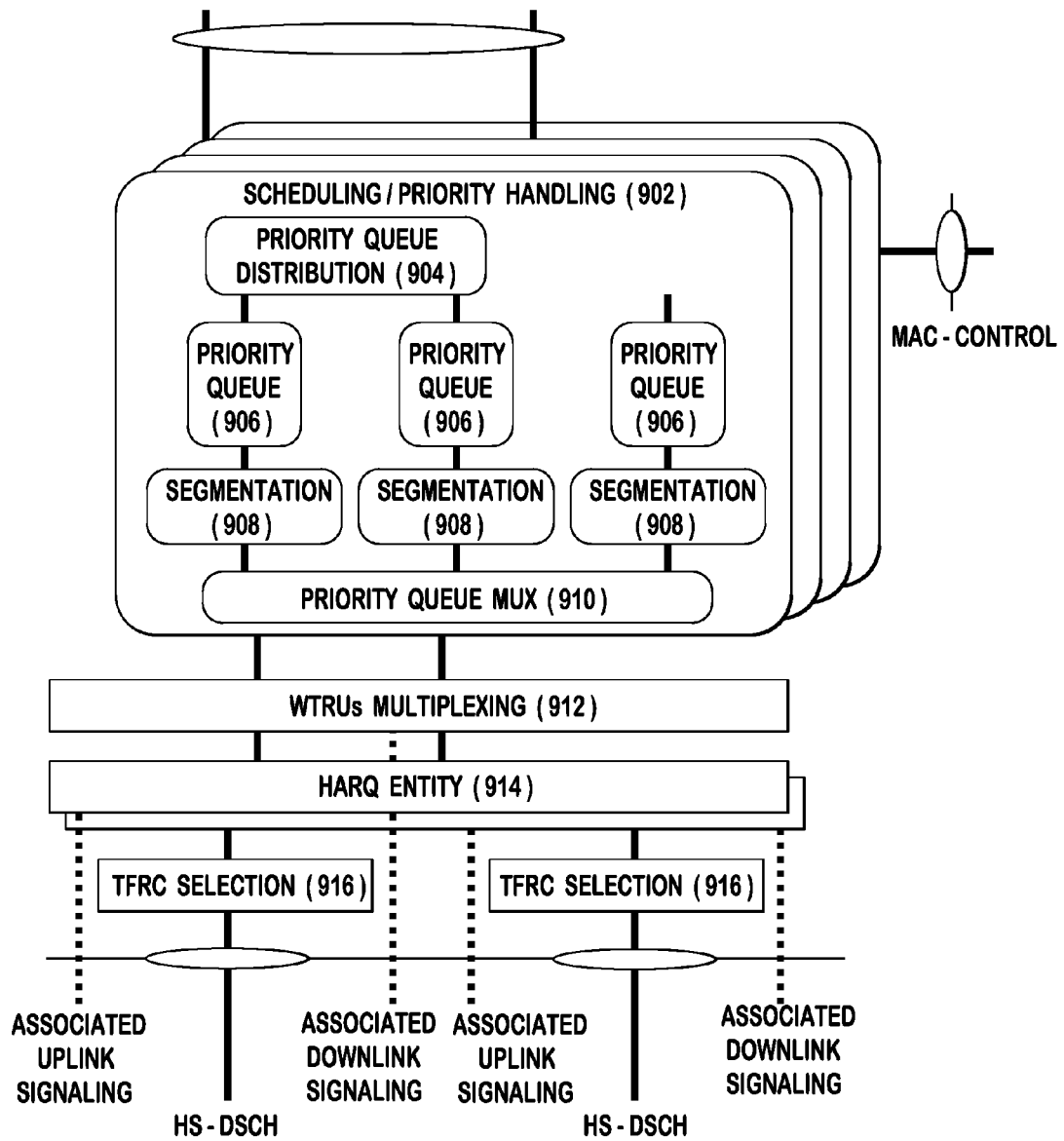
FIG. 9 is an example MAC-ehs entity on the UTRAN side supporting WTRU multiplexing in one embodiment.

FIG. 9 is an example MAC-ehs entity on the UTRAN side supporting WTRU multiplexing in one embodiment. The scheduling/priority handling entity 902 manages HS-DSCH resources between HARQ entities and data flows according to their priority class. The priority queue distribution entity 904 distributes received MAC-ehs SDUs to priority queues 906. The segmentation entity 908 performs necessary segmentation of MAC-ehs SDUs. The priority queue MUX entity 910 determinates the number of octets to be included in a MAC-ehs PDU from each priority queue based on the scheduling decision and available TFRC for this function. The HARQ entity 914 handles the HARQ functionalities. The TFRC selection entity 916 performs the TFRC selection for MAC-ehs.

In order to allow the network to multiplex a number of WTRUs in an MAC-ehs transport block, a new entity called "WTRUs multiplexing entity" 912 may be introduced, (e.g., between the scheduling/priority handling entity 902 and the HARQ entity 914). For each WTRU there may be one scheduling/priority handling entity 902, (e.g., priority queue distribution, segmentation, and priority queue mux), however, there may be one WTRUs multiplexing entity 912. Alternatively, there may be one scheduling/priority handling entity 902 for a group of WTRUs that may be multiplexed together.

The WTRUs multiplexing entity 912 determines the number of WTRUs and amount of data that may be included in the (final) MAC-ehs PDU. The WTRUs multiplexing entity may multiplex the MAC-ehs PDUs created for each WTRU in the scheduling/priority handling entity 902 and deliver the (final) MAC-ehs PDU to the HARQ entity 914. Alternatively, the WTRUs multiplexing entity 912 may multiplex reordering PDUs of multiple WTRUs in one MAC-ehs PDU by using one of the formats disclosed above.

The priority queue MUX entity 910 may be bypassed and the WTRUs multiplexing entity 912 may have the functionality of determining the number of bytes to be included in an MAC-ehs PDU from each priority queue and from each WTRU. Embodiments for HARQ operations for multiplexing of WTRUs in a same transport block are described below.

In one embodiment, WTRUs multiplexed in the transport block may send back a positive acknowledgement (ACK) or a negative acknowledgement (NACK). When a Node-B receives a NACK from one or multiple WTRUs for which the data has been multiplexed, the Node-B may retransmit the same transport block to the group of WTRUs as it was sent before so that the WTRUs may perform soft combining.

Alternatively, the Node-B may transmit a new transport block which may contain the MAC-ehs payloads of the WTRUs of the group which sent a NACK, excluding the data of the WTRUs which sent an ACK. For example, in case data for three WTRUs were multiplexed and if UE1 and UE3 sent back a NACK while UE2 sent back an ACK, the Node-B may send a new transport block containing the data for UE1 and UE3.

Alternatively, the Node-B may transmit a new transport block which may contain new MAC-ehs payload in addition to the negatively acknowledged MAC-ehs payload of the WTRUs. For example, if data to UE1 and UE2 were multiplexed in the initial transmission, and UE1 sent a NACK while UE2 sent an ACK, the Node-B may send a new transport block including the negatively acknowledged data for UE1 and new data for any other WTRU.

In another embodiment, the WTRUs which received multiplexed data may not send any ACK or NACK to the network, and the Node-B may transmit the same transport block for a predetermined number of times to the WTRUs. The WTRUs may use the new data indicator or the physical layer redundancy version coding to find out if it is a new transmission or a retransmission. In case of a retransmission, the WTRU may combine the data with the data previously received.

In case the WTRU is configured for HS-SCCH-less operation, the CRC of the HS-DSCH may be partially masked with the group WTRU identity assigned to the WTRUs for which the data is multiplexed. When the layer1 on the WTRU side decodes successfully the HS-DSCH, the WTRU may decode the group WTRU identity by using the CRC, and find out if the data is addressed to the WTRU.

Figure 10:
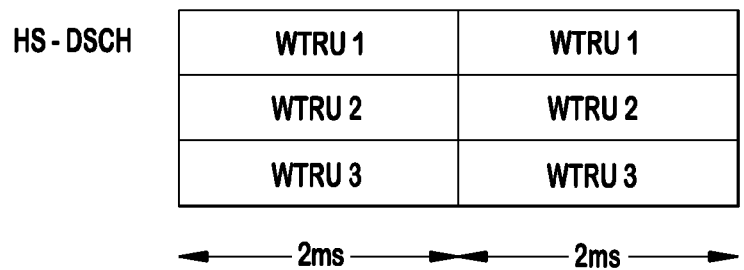
FIG. 10 shows multiple WTRUs scheduled within a single 2 ms TTI using code division multiplexing (CDM)
Figure 11:
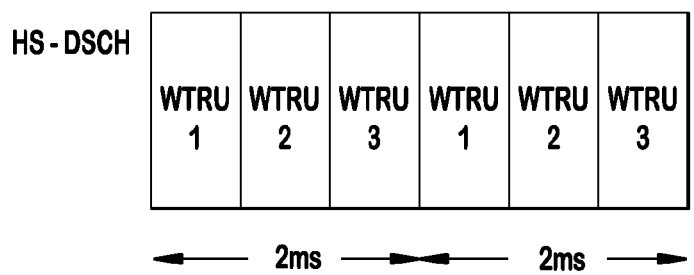
FIG. 11 shows multiple WTRUs scheduled in a single 2 ms TTI using time division multiplexing (TDM)

In current HSDPA, multiple WTRUs may be scheduled within a single 2 ms TTI using code division multiplexing (CDM), as shown in FIG. 10. To mitigate the inter-code interference among code-multiplexed MIMO-capable WTRUs, time division multiplexing (TDM) of the WTRUs within one TTI may be used. In that case, the Node B scheduler allocates an individual timeslot within a TTI to a user, as shown in FIG. 11.

Hereafter, the terminology "TDM mode" is used to describe a mode of operation where transmissions destined to multiple WTRUs are time-multiplexed within a TTI. While embodiments may be described in the context of a slotwise time-multiplexing, (that is each WTRU is assigned to a single radio slot), other time-multiplexing approaches may be applicable. In one example of such time-multiplexing approach may be transmitting the data symbols from multiple WTRUs in time-alternation. In the following description, the term "time-multiplexing slot" refers to the set of symbols in a TTI dedicated to a single WTRU.

Embodiments for switching between the legacy mode and a TDM mode and activating and deactivating the TDM mode are disclosed hereafter. The TDM mode may be configured and operated in a static or semi-static way, or alternatively in a dynamic way. When TDM mode is configured and enabled, the WTRU operates with the knowledge that any HS-PDSCH received may carry data for more than one WTRU in a time-division manner. In static or semi-static configuration, the WTRU may be configured to operate in a TDM mode for several consecutive subframes, whereas in dynamic configuration, the WTRU is indicated on a subframe-by-subframe basis whether or not the transmission is using a TDM mode.

The TDM mode may be a semi-static parameter signalled via a high layer. A new information element (IE) for the TDM mode configuration may be included in an RRC message. An RNC may send this message to the WTRU, and the WTRU extracts the TDM MIMO mode configuration information from this RRC message. Alternatively, layer 2 signals may be used for the configuration of the TDM mode, (e.g., MAC header). Upon reception of this parameter, the WTRU may apply the TDM mode configuration. When configured in a TDM mode, transmissions to the WTRU may be sent in a TDM mode.

In another embodiment, the TDM mode may be activated and deactivated dynamically via lower-layer signalling.

In one embodiment, the TDM mode may be activated and deactivated via out-of-band signalling. The out-of-band signalling may be implemented using an HS-SCCH order. Table 1 shows an example implementation of the HS-SCCH order mapping when the order type is "000." A new order type may be introduced for the TDM activation and deactivation.

TABLE 1

| Order type | Order bits | | | Order |
|---|---|---|---|---|
| | $x_{ord,1} = x_{drx,1}$ | $x_{ord,2} = x_{dtx,1}$ | $x_{ord,3} = x_{hs\text{-}scch\text{-}less,1}$ | |
| 000 | 0 | 0 | 0 | DRX, DTX, HS-SCCH-less deactivation |
| | 0 | 0 | 1 | DRX, DTX deactivation HS-SCCH-less activation |
| | 0 | 1 | 0 | DRX, HS-SCCH-less deactivation, DTX activation |
| | 0 | 1 | 1 | DRX deactivation, DTX, HS-SCCH-less activation |
| | 1 | 1 | 0 | DRX, DTX activation, HS-SCCH-less deactivation |
| | 1 | 1 | 1 | DRX, DTX, HS-SCCH-less activation |
| | 1 | 0 | 0 | TDM deactivation |
| | 1 | 0 | 1 | TDM activation |

Upon reception of the TDM activation order, subsequent transmissions to the WTRU may be sent in a TDM mode (e.g., until a deactivation order is received or an RRC configuration message disabling the TDM mode is received). Alternatively, the TDM mode may be further indicated dynamically via in-band signalling.

In another embodiment, the TDM mode indication may be carried by the in-band signalling over an HS-SCCH so that the TDM mode may be dynamically switched on TTI-wise or slot wise. The HS-SCCH may be of the type for non-MIMO, (e.g., HS-SCCH type 1), or of the type for MIMO, (e.g., HS-SCCH type 3).

The TDM mode indication may be set based on the HS-SCCH number. Conventionally, seven channelization code set bits of the HS-SCCH ($x_{ccs,1}$, $x_{ccs,2}$, ..., $x_{ccs,7}$) are set for assigning a channelization code set for a WTRU. Given P (multi-)codes starting at code O, and given the HS-SCCH number, the information-field is calculated using the unsigned binary representation of integers calculated by the expressions below. For the first three bits (code group indicator) of which $x_{ccs,1}$ is the MSB:

$$x_{ccs,1}, x_{ccs,2}, x_{ccs,3} = \min(P-1, 15-P).$$

For HS-SCCH type 1, if 64QAM is not configured for the WTRU, or if 64QAM is configured and $x_{ms,1}=0$, then P and O may fulfill the following:

$$|O-1-\lfloor P/8 \rfloor * 15| \mod 2 = (HS\text{-}SCCH \text{ number}) \mod 2,$$

and for the last four bits (code offset indicator) of which $x_{ccs,4}$ is the MSB, and then $$x_{ccs,4}, x_{ccs,5}, x_{ccs,6}, x_{ccs,dummy} = |O-1-\lfloor P/8 \rfloor * 15|,$$

where $x_{ccs,dummy}$ is a dummy bit that is not transmitted on HS-SCCH. $x_{ccs,7}$ may be set as follows:

$$x_{ccs,7} = \begin{cases} 0 & \text{if Normal mode} \\ 1 & \text{if TDM mode.} \end{cases}$$

If 64QAM is configured for the WTRU and $x_{ms,1}=1$, P and O may fulfill the following:

$$|O-1-\lfloor P/8 \rfloor * 15| \mod 4 = (HS\text{-}SCCH \text{ number}) \mod 4,$$

and $$x_{ccs,4}, x_{ccs,5}, x_{ccs,dummy1}, x_{ccs,dummy2} = |O-1-\lfloor P/8 \rfloor * 15|,$$

where $x_{ccs,dummy1}$, $x_{ccs,dummy2}$ are two dummy bits that are not transmitted on HS-SCCH. $x_{ccs,6}$ and $x_{ccs,7}$ may be set as follows:

$$x_{ccs,6} = \begin{cases} 0 & \text{if Normal mode} \\ 1 & \text{if TDM mode} \end{cases}, \text{ and}$$

$$x_{ccs,7} = \begin{cases} 0 & \text{if 16QAM} \\ 1 & \text{if 64QAM.} \end{cases}$$

For HS-SCCH type 3, if 64QAM is not configured for the WTRU, or if 64QAM is configured and $x_{ms,1}$, $x_{ms,2}$, $x_{ms,3}$ is not equal to "101", P and O may fulfill the following:

$$|O-1-\lfloor P/8 \rfloor * 15| \mod 2 = (HS\text{-}SCCH \text{ number}) \mod 2,$$

and for the last four bits (code offset indicator) of which $x_{ccs,4}$ is the MSB $$x_{ccs,4}, x_{ccs,5}, x_{ccs,6}, x_{ccs,dummy} = |O-1-\lfloor P/8 \rfloor * 15|,$$

where $x_{ccs,dummy}$ is a dummy bit that is not transmitted on HS-SCCH. $x_{ccs,7}$ may be set as follows:

$$x_{ccs,7} = \begin{cases} 0 & \text{if Normal mode} \\ 1 & \text{if TDM mode.} \end{cases}$$

If 64QAM is configured for the WTRU and $x_{ms,1}$, $x_{ms,2}$, $x_{ms,3}$ is equal to "101", P and O may fulfill the following:

$$|O-1-\lfloor P/8 \rfloor * 15| \mod 4 = (HS\text{-}SCCH \text{ number}) \mod 4,$$

and $$x_{ccs,4}, x_{ccs,5}, x_{ccs,dummy1}, x_{ccs,dummy2} = |O-1-\lfloor P/8 \rfloor * 15|,$$

where $x_{ccs,dummy1}$, $x_{ccs,dummy2}$ are two dummy bits that are not transmitted on HS-SCCH. $x_{ccs,6}$ and $x_{ccs,7}$ may be set as follows:

$$x_{ccs,6} = \begin{cases} 0 & \text{if Normal mode} \\ 1 & \text{if TDM mode,} \end{cases}$$

$x_{ccs,7}=0$ if the modulation for the secondary transport block is QPSK, and $x_{ccs,7}=1$ if the number of transport blocks=1.

It should be noted that the in-band and out-band signalling are not mutually exclusive. For example, when the TDM is activated by out-of-band signalling (e.g., HS-SCCH order), in-band signalling may still be used to enable and disable the TDM mode on a slot-basis.

Embodiments for signalling downlink control information to WTRUs that are multiplexed within a single TTI are discloses hereafter.

A dedicated HS-SCCH may be transmitted to each WTRU having an allocation in the corresponding TTI.

In one embodiment, a Node B may send the conventional HS-SCCH to each WTRU and the timeslot(s) or time-multiplexing slot carrying its associated data to each WTRU, (e.g., on the HS-PDSCH), within a TTI may be signaled either implicitly or explicitly.

Embodiments for implicit indication of the time slot are disclosed hereafter. The HS-SCCH number may be used to indicate the slot allocation within one TTI. For example in the case where 3 time-multiplexing slots are configured, if (HS-SCCH number) mod 3=0, it may indicate that the WTRU is assigned to slot 1, if (HS-SCCH number) mod 3=1, it may indicate that the WTRU is assigned to slot 2, if (HS-SCCH number) mod 3=2, it may indicate that the WTRU is assigned to slot 3.

Alternatively, the cyclic redundancy check (CRC) of the transport block carried on the HS-PDSCH may be masked with the WTRU H-RNTI. When a WTRU detects an H-RNTI on the HS-SCCH, the WTRU attempts to decode a specific time-multiplexing slot and uses its own H-RNTI for CRC decoding to identify which time-multiplexing slot was intended to this WTRU.

Alternatively, each TDM-capable WTRU may be assigned with multiple H-RNTIs and one of them may be used for each WTRU at a time, and each H-RNTI may be associated with a particular time-multiplexing slot. For example, if a WTRU is assigned with three H-RNTIs, (H-RNTI1, H-RNTI2, and H-RNTI3), and if H-RNTI2 is decoded in the HS-SCCH, the WTRU may determine that the associated data is transmitted, (e.g., on the HS-PDSCH), over the second slot.

Alternatively, time-multiplexing slot allocation may be indicated based on the single WTRU ID or H-RNTI. Each WTRU may be assigned with one unique H-RNTI. For example, if (WTRU ID) mod 3=0, it may indicate that the WTRU is assigned to the first time-multiplexing slot of the TTI, if (WTRU ID) mod 3=1, it may indicate that the WTRU is assigned to the second time-multiplexing slot of the TTI, and if (WTRU ID) mod 3=2, it may indicate that the WTRU is assigned to the third time-multiplexing slot of the TTI.

Embodiments for explicit indication of the time-multiplexing slot are disclosed hereafter. The HS-SCCH type 1 and 3 may be used to signal the time-multiplexing slot allocation. For example, the channelization code set bits $x_{ccs,4}, x_{ccs,5}, \ldots, x_{ccs,7}$ may be coded as follows (the first three bits $x_{ccs,1}, x_{ccs,2}, x_{ccs,3}$ may be coded using the conventional method.

For HS-SCCH type 1, if 64QAM is not configured for the WTRU, or if 64QAM is configured and $x_{ms,1}=0$, P and O may fulfill the following:

$$|O-1-\lfloor P/8 \rfloor *15| \mod 4 = (HS\text{-}SCCH \text{ number}) \mod 4,$$
and for the last four bits (code offset indicator) of which $x_{ccs,4}$ is the MSB, $$x_{ccs,4}, x_{ccs,5}, x_{ccs,dummy1}, x_{ccs,dummy2} = |O-1-\lfloor P/8 \rfloor *15|,$$

where $x_{ccs,dummy1}, x_{ccs,dummy2}$ are two dummy bits that are not transmitted on HS-SCCH. $x_{ccs,6}$ and $x_{ccs,7}$ may be set as follows:

$$x_{ccs,6} x_{ccs,7} = \begin{cases} 00 & \text{if slot 1 is assigned} \\ 01 & \text{if slot 2 is assigned} \\ 10 & \text{if slot 3 is assigned} \\ 11 & \text{not used.} \end{cases}$$

If 64QAM is configured for the WTRU and $x_{ms},1=1$, P and O may fulfill the following:

$$|O-1-\lfloor P/8 \rfloor *15| \mod 4 = (HS\text{-}SCCH \text{ number}) \mod 4,$$
and $$x_{ccs,4}, x_{ccs,5}, x_{ccs,dummy1}, x_{ccs,dummy2} = |O-1-\lfloor P/8 \rfloor *15|,$$

where $x_{ccs,dummy1}, x_{ccs,dummy2}$ are two dummy bits that are not transmitted on HS-SCCH. $x_{ccs,6}$ and $x_{ccs,7}$ may be set as follows:

$$x_{ccs,6} = \begin{cases} 0 & \text{if slot 1 is assigned} \\ 1 & \text{if slot 2 is assigned} \end{cases}, \text{ and}$$

$$x_{ccs,7} = \begin{cases} 0 & \text{if } 16QAM \\ 1 & \text{if } 64QAM. \end{cases}$$

For HS-SCCH type 3, if 64QAM is not configured for the WTRU, or if 64QAM is configured and $x_{ms,1}, x_{ms,2}, x_{ms,3}$ is not equal to "101", P and O may fulfill the following:

$$|O-1-\lfloor P/8 \rfloor *15| \mod 4 = (HS\text{-}SCCH \text{ number}) \mod 4,$$
and for the last four bits (code offset indicator) of which $x_{ccs,4}$ is the MSB $$x_{ccs,4}, x_{ccs,5}, x_{ccs,dummy1}, x_{ccs,dummy} = |O-1-\lfloor P/8 \rfloor *15|,$$

where $x_{ccs,dummy1}, x_{ccs,dummy2}$ are two dummy bits that are not transmitted on HS-SCCH. $x_{ccs,6}$ and $x_{ccs,7}$ may be set as follows:

$$x_{ccs,6} x_{ccs,7} = \begin{cases} 00 & \text{if slot 1 is assigned} \\ 01 & \text{if slot 2 is assigned} \\ 10 & \text{if slot 3 is assigned} \\ 11 & \text{not used} \end{cases}$$

If 64QAM is configured for the WTRU and $x_{ms,1}, x_{ms,2}, x_{ms,3}$ is equal to "101", P and O may fulfill the following:

$$|O-1-\lfloor P/8 \rfloor *15| \mod 4 = (HS\text{-}SCCH \text{ number}) \mod 4,$$
and $$x_{ccs,4}, x_{ccs,5}, x_{ccs,dummy1}, x_{ccs,dummy2} = |O-1-\lfloor P/8 \rfloor *15|,$$

where $x_{ccs,dummy1}, x_{ccs,dummy2}$ are two dummy bits that are not transmitted on HS-SCCH. $x_{ccs,6}$ and $x_{ccs,7}$ may be set as follows:

$$x_{ccs,6} = \begin{cases} 0 & \text{if slot 2 is assigned} \\ 1 & \text{if slot 3 is assigned,} \end{cases}$$

and $x_{ccs,7}=0$ if the modulation for the secondary transport block is QPSK, and $x_{ccs,7}=1$ if the number of transport blocks=1.

Figure 12:
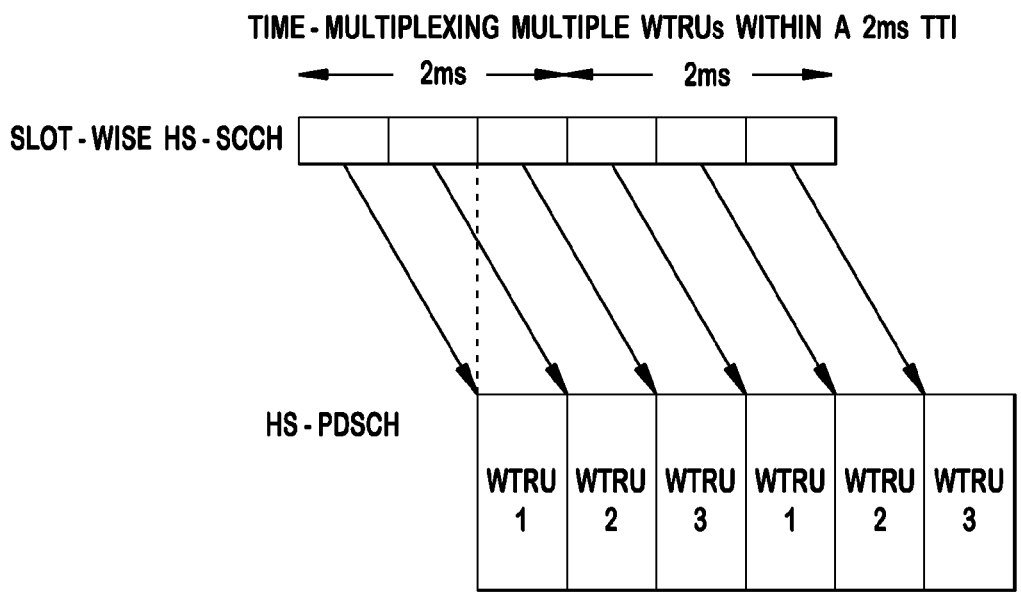
FIG. 12 shows example slot-wise HS-SCCH signaling scheme and timing relationship between HS-SCCH and HS-PDSCH.

In another embodiment, a new HS-SCCH format may be defined to occupy one time-multiplexing slot so that three HS-SCCHs may be time multiplexed into one 2 ms TTI and share the same channelization code. FIG. 12 shows example slot-wise HS-SCCH signaling scheme and timing relationship between HS-SCCH and HS-PDSCH. Similar to the conventional HS-SCCHs, HS-SCCH type 1 applies to non-MIMO WTRUs in TDM mode while HS-SCCH type 3 applies to MIMO WTRUs in TDM mode, or a Node B may use HS-SCCH type 3 as downlink signalling for both non-MIMO WTRUs and MIMO WTRUs.

Figure 13:
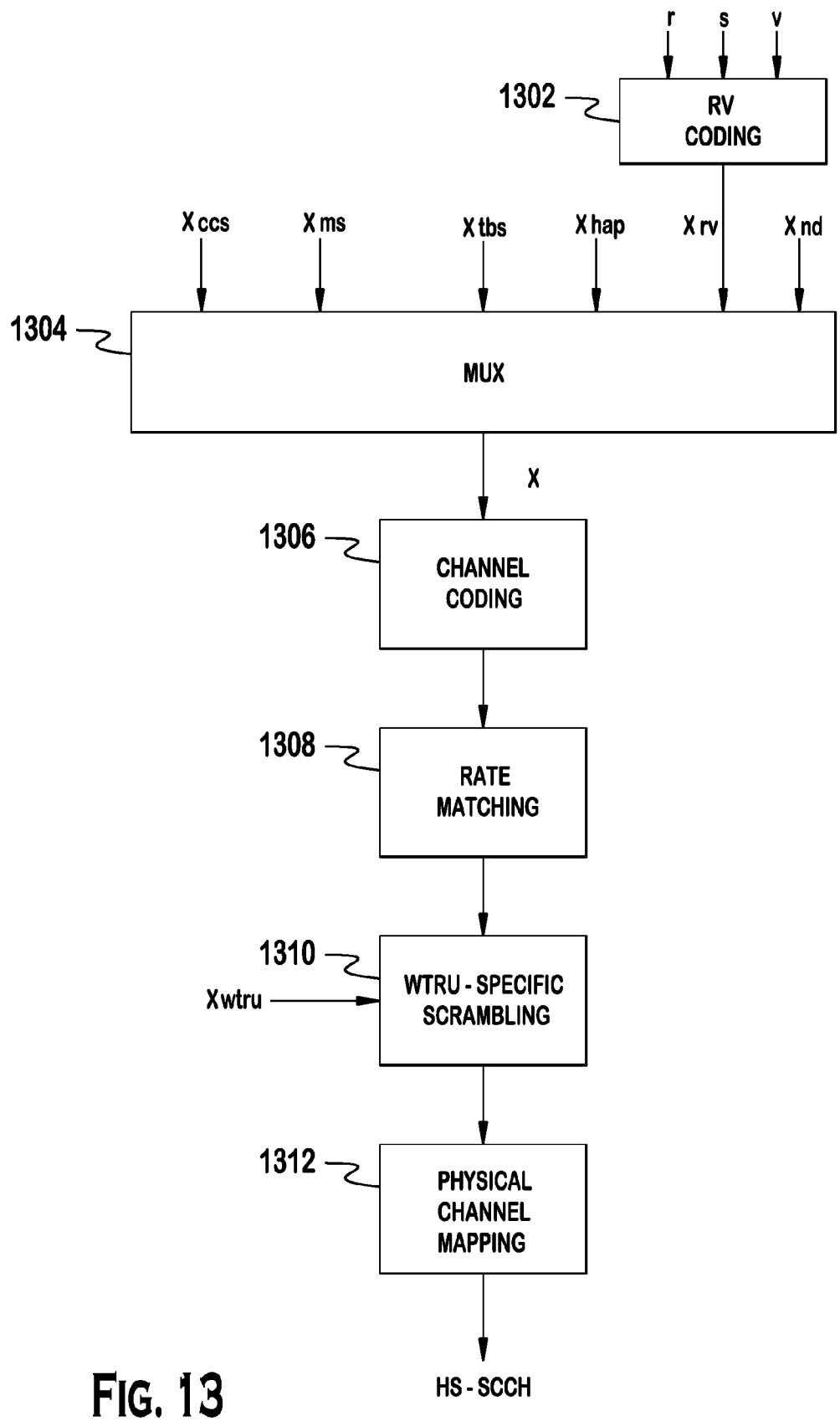
FIG. 13 is an example flow diagram of HS-SCCH encoding for a non-MIMO mode.

FIG. 13 is an example flow diagram of HS-SCCH encoding for a non-MIMO mode, (i.e., new HS-SCCH format that fits one time slot). The redundancy version (RV) parameters r, s and constellation version parameter b are coded jointly to produce the value $X_{rv}$ (1302). The channelization code set information $x_{ccs}$, modulation scheme information $x_{ms}$, transport block size information $x_{tbs}$, HARQ process information $x_{hap}$, redundancy and constellation version $x_{rv}$, new data indicator $x_{nd}$ are multiplexed into a sequence X (1304). Channel coding and rate matching are performed on the sequence X (1306, 1308). WTRU-specific scrambling, (e.g., all or part of the sequence X is XORed with the WTRU identity ($X_{WTRU}$) bits or a sequence derived from the WTRU identity), is performed with WTRU identity $x_{ue}$ (1310), before mapping to HS-SCCH physical channel (1312). Either all or partial control information may be coded and transmitted. At the WTRU receiver, by de-scrambling the received HS-SCCH using its own WTRU ID, the WTRU may determine if the HS-DSCH transmission was intended for it or not. As there is no CRC in the coding for HS-SCCH, the transport block CRC may be masked or scrambled with the WTRU ID.

Figure 14:
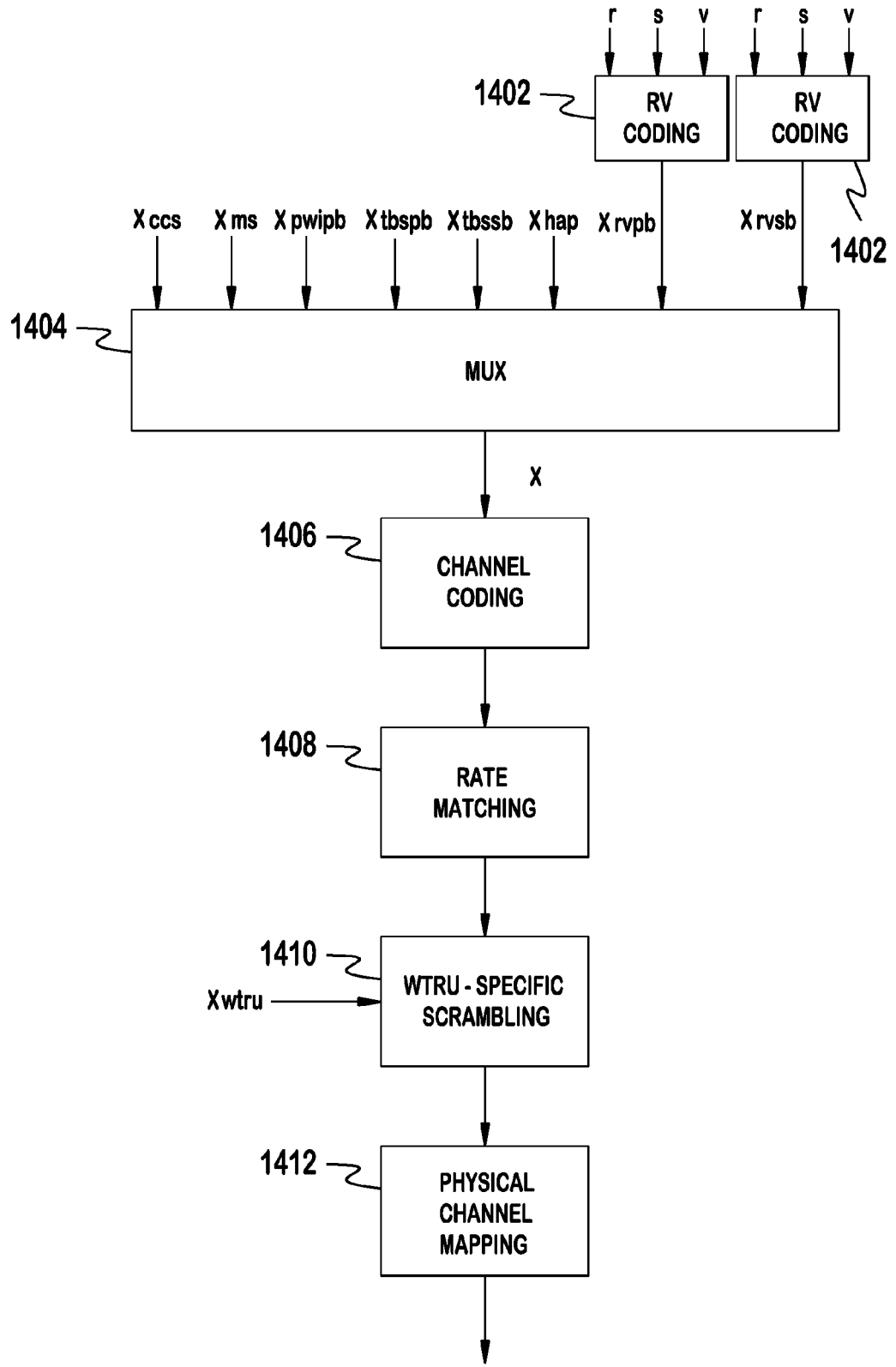
FIG. 14 is an example flow diagram of HS-SCCH encoding for an MIMO mode.

FIG. 14 is an example flow diagram of HS-SCCH encoding for an MIMO mode, (i.e., new HS-SCCH format that fits one time slot). For each of the primary transport block and a secondary transport block if two transport blocks are transmitted on the associated HS-PDSCH(s), the RV parameters r, s and constellation version parameter b are coded jointly to produce the values $X_{rvpb}$ and $X_{rvsb}$, respectively (1402). Channelization code set information $x_{ccs}$, modulation scheme and number of transport blocks information $x_{ms}$, precoding weight information for the primary transport block $x_{pwipb}$, transport block size information for the primary transport block $x_{tbspb}$, transport block size information for the secondary transport block $x_{tbssb}$, HARQ process information $x_{hap}$, redundancy and constellation version for the primary and secondary transport blocks $x_{rvpb}$, $x_{rvsb}$ are multiplexed into a sequence X (1404). Channel coding and rate matching are performed on the sequence X (1406, 1408). WTRU-specific scrambling is performed with WTRU identity $x_{WTRU}$ (1410), before mapping to HS-SCCH physical channel (1412). Either all or partial control information may be coded and transmitted. At the WTRU receiver, by de-scrambling the received HS-SCCH using its own WTRU ID, the WTRU may determine if the HS-DSCH transmission was intended for it or not. As there is no CRC in the coding for HS-SCCH, the transport block CRC may be masked or scrambled with the WTRU ID.

Figure 15:
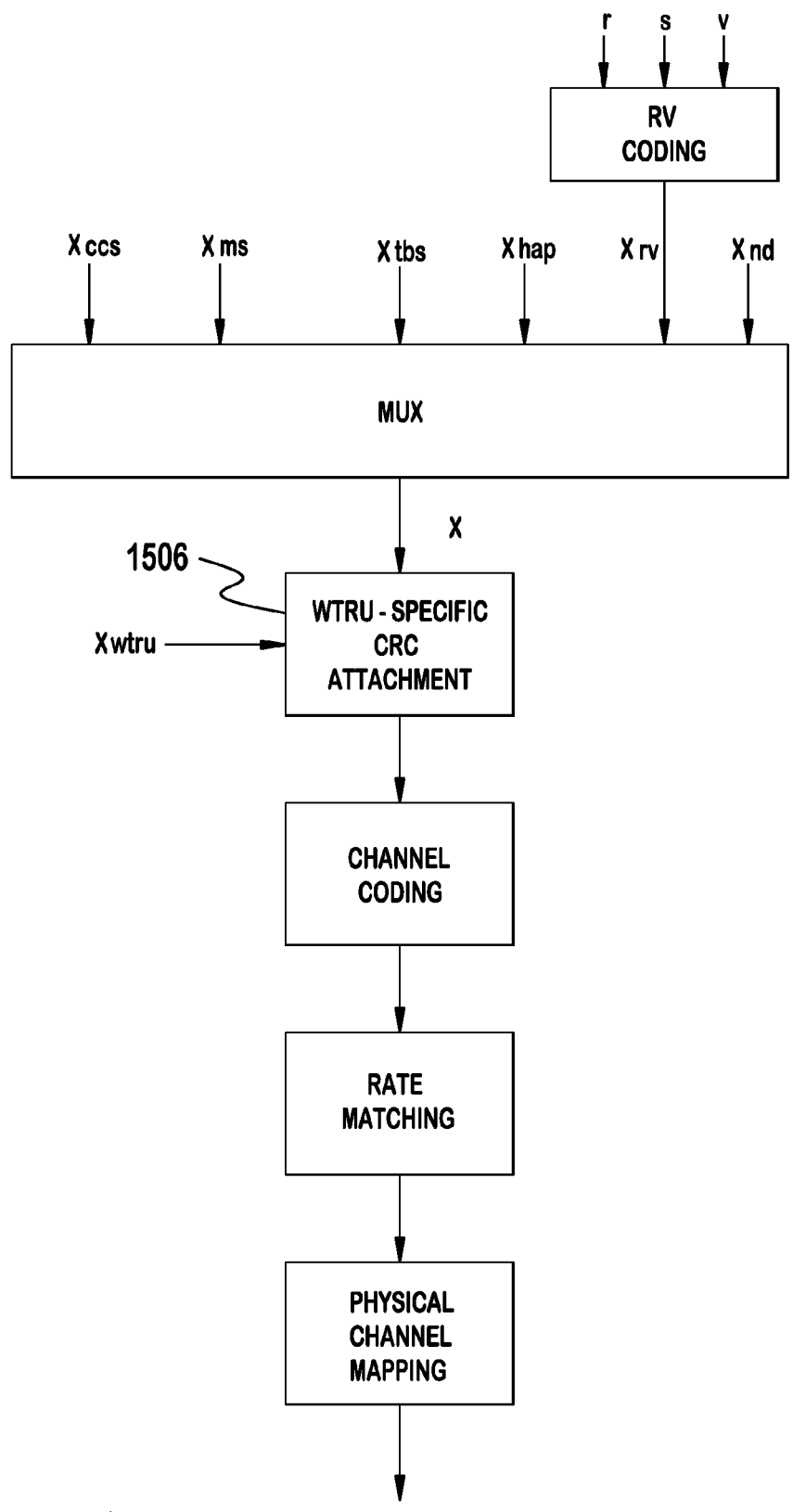
FIGS. 15 and 16 are example flow diagrams of HS-SCCH encoding for a non-MIMO mode and an MIMO mode, respectively.
Figure 16:
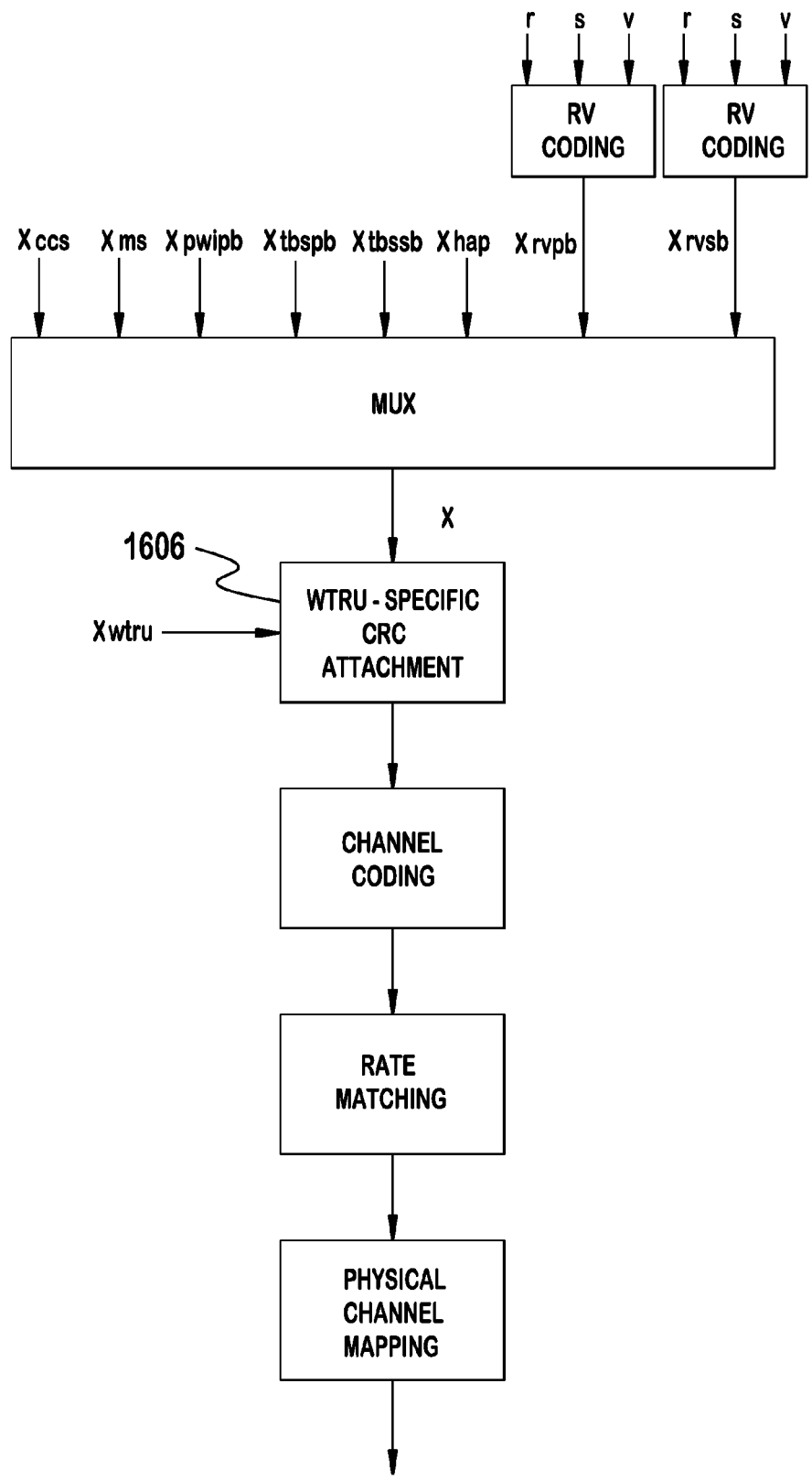

FIGS. 15 and 16 are other example flow diagrams of HS-SCCH encoding for a non-MIMO mode and an MIMO mode, respectively, (i.e., new HS-SCCH format that fits one time slot). In these examples, instead of performing WTRU-specific scrambling on the sequence X (1310, 1410) as shown in FIGS. 13 and 14, a CRC is generated from the sequence X and WTRU-specific CRC attachment may be performed with the CRC bits (e.g., all or part of the CRC bits are XORed with the WTRU identity ($X_{WTRU}$) bits or a sequence derived from the WTRU identity) (1506, 1606). Either all or partial control information may be coded and transmitted.

In another embodiment, some of the control information in part 1 of the HS-SCCH may not be signaled and the unused field(s) may be reinterpreted to reduce the required information bits. For example, code group or number of codes P may be signaled and code offset O may be common to TDM WTRUs or may be signaled by higher layers, and the bits for O may be reinterpreted. Alternatively, neither P nor O may be signaled and TDM WTRUs may use the same set of codes, (e.g., all 15 codes), and bits for P and O may be reinterpreted. Alternatively, a subset of the channelization codes may be allowed and bits for P and O may be reinterpreted. Alternatively, fixed modulation scheme or a subset of the modulation schemes may be allowed and bits for modulation scheme may be reinterpreted. Alternatively, a subset of the transport block sizes may be allowed and bits for transport block size may be reinterpreted. For MIMO-capable WTRUs, dual or multiple stream transmission may not be allowed.

In another embodiment, the spreading factor of the HS-SCCH may be reduced to 128/N, where N denotes the maximum number of WTRUs whose HS-PDSCH time multiplexed into one 2 ms TTI, which can be any integer number of power of 2. In this embodiment, N HS-SCCHs may be time multiplexed into one 2 ms TTI. N HS-SCCHs may be share the same channelization code or use the different channelization codes. This allows multiple HS-SCCHs for different WTRUs transmitted in a TDM fashion.

In another embodiment, a joint HS-SCCH format for time multiplexed WTRUs may be defined which occupies one 2 ms TTI. A joint HS-SCCH format may include a common part and a plurality of WTRU-specific parts. Each of the WTRU-specific parts may include CRC masked with each WTRU H-RNTI. The common part may include the common control information that is shared for TDM WTRUs while the WTRU-specific parts include the WTRU-specific control information for each WTRU.

The common part may include at least one of the following: channelization code set information, modulation scheme information, HARQ process information, redundancy and constellation version, new data indicator, WTRU identity, transport block size information, precoding weight information (if one transport block is configured for MIMO mode), number of transport blocks information (if one transport block is configured for MIMO mode), precoding weight information for the primary transport block (if two transport blocks are configured for MIMO mode), transport block size information for the primary transport block (if two transport blocks are configured for MIMO mode), transport block size information for the secondary transport block (if two transport blocks are configured for MIMO mode), redundancy and constellation version for the primary transport block (if two transport blocks are configured for MIMO mode), redundancy and constellation version for the secondary transport block (if two transport blocks are configured for MIMO mode), etc. The information that is not included in the common part may be signaled via the WTRU-specific parts.

Any parameter included in the common part may not be included in the WTRU-specific parts, and vice versa. The common part may include the control information shared for the TDM WTRUs as much as possible such that the least control information may be included in individual WTRU-specific parts. Alternatively, the common part may include limited common control information shared for the TDM WTRUs such that the more control information may be included in each of the WTRU-specific parts. Alternatively, the joint HS-SCCHs may be scheduled based on the tradeoff of scheduling flexibility and signaling overhead reduction.

Embodiments for addressing the common part and WTRU-specific parts are disclosed hereafter. In one embodiment, the common part may not be masked with a WTRU ID, and each of the WTRU-specific parts may be masked with a corresponding WTRU identity, (e.g., CRC masking with an H-RNTI). In this case, any WTRUs within a cell may decode the common part, and each WTRU determines which one of the WTRU-specific parts is addressed to itself based on the WTRU-specific masking on the WTRU-specific parts.

In another embodiment, the common part may be masked with a group WTRU identity, (e.g., a group H-RNTI), and each of the WTRU-specific parts may be masked with a corresponding WTRU identity, (e.g., CRC masking with an H-RNTI). A group WTRU identity may be assigned to several WTRUs by a high layer, (e.g., via an RRC configuration or reconfiguration message), or by the layer 1 signaling, (e.g., an HS-SCCH order). The group WTRU identity may be applied to the common part of the joint HS-SCCH, (i.e., WTRU-specific scrambling), to indicate which WTRUs the control information is addressed to. The WTRUs belonging to this group may decode the common part to obtain the control information by using the group WTRU identity, and then each WTRU detects which one of the WTRU-specific parts is addressed to itself by using its own H-RNTI.

Figure 17:
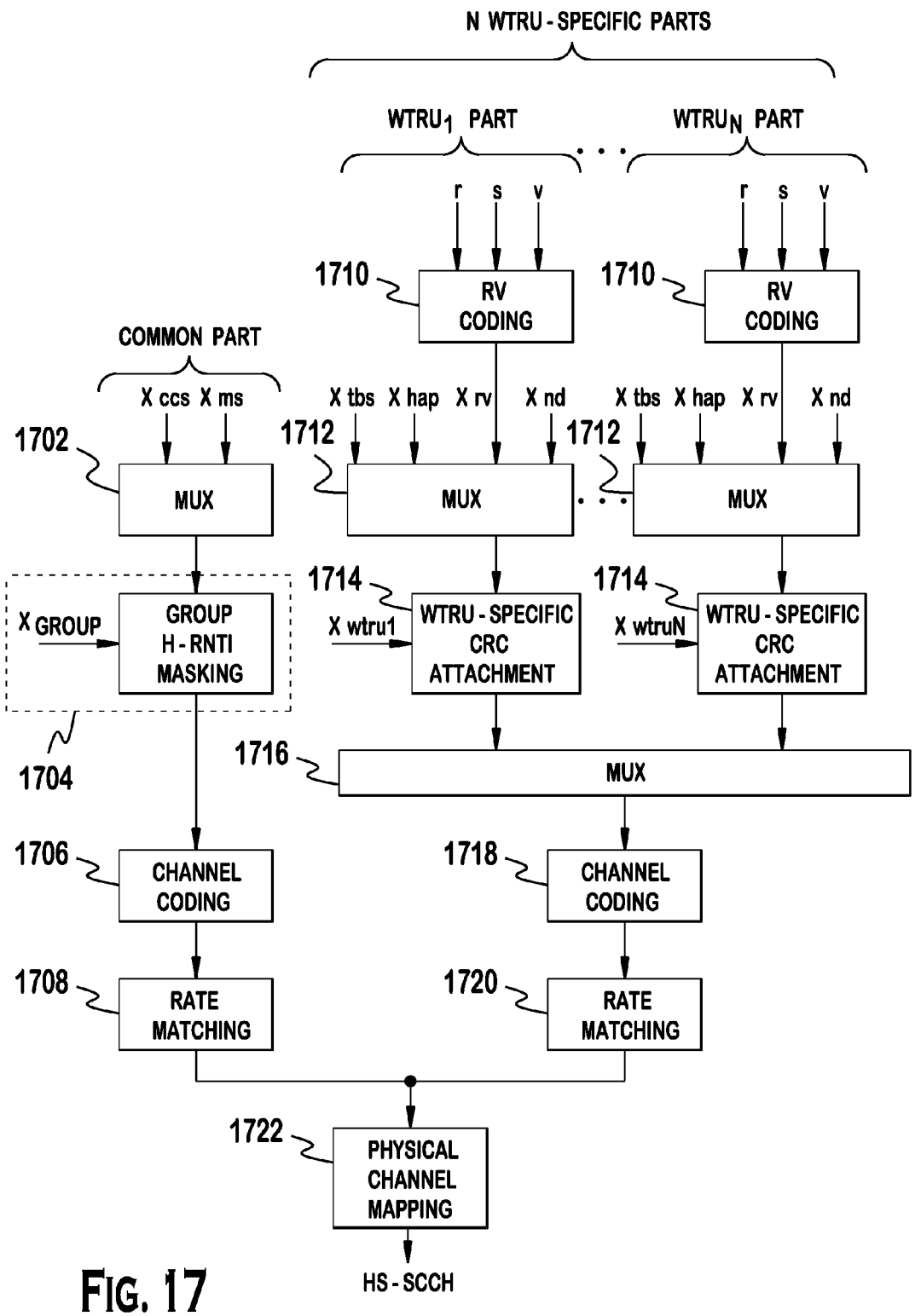
FIG. 17 shows an example encoding chain of the joint HS-SCCH for a non-MIMO mode.

FIG. 17 shows an example encoding chain of the joint HS-SCCH for a non-MIMO mode. In this example, the channelization code set information $x_{ccs}$, and the modulation scheme information $x_{ms}$ are the common part. The channelization code set information $x_{ccs}$, modulation scheme information $x_{ms}$ are multiplexed (1702) and group H-RNTI masking, (e.g., all or part of the common part is XORed with the WTRU identity ($X_{WTRU}$) bits or a sequence derived from the WTRU identity), may be performed (1704) before channel coding and rate matching (1706, 1708). Alternatively, as disclosed above, the group H-RNTI masking (1704) may not be performed on the common part. For each WTRU, the RV parameters r, s and constellation version parameter b are coded jointly to produce the value $X_{rv}$ ((1710), and transport block size information $x_{tbs}$, HARQ process information $x_{hap}$, redundancy and constellation version $x_{rv}$, and new data indicator $x_{nd}$ are multiplexed (1712), and WTRU-specific CRC attachment is performed, (all or part of the CRC bits generated from each WTRU-specific part is XORed with the corresponding WTRU identity ($X_{WTRU}$) bits or a sequence derived from the WTRU identity) (1714). The WTRU-specific parts are then multiplexed (1716) and channel coding and rate matching are performed (1718, 1720). The common part and the WTRU-specific parts are combined and physical channel mapping is performed (1722). Alternatively, WTRU-specific CRC may be attached to the common part and WTRU-specific scrambling may be performed to the WTRU-specific parts.

Figure 18:
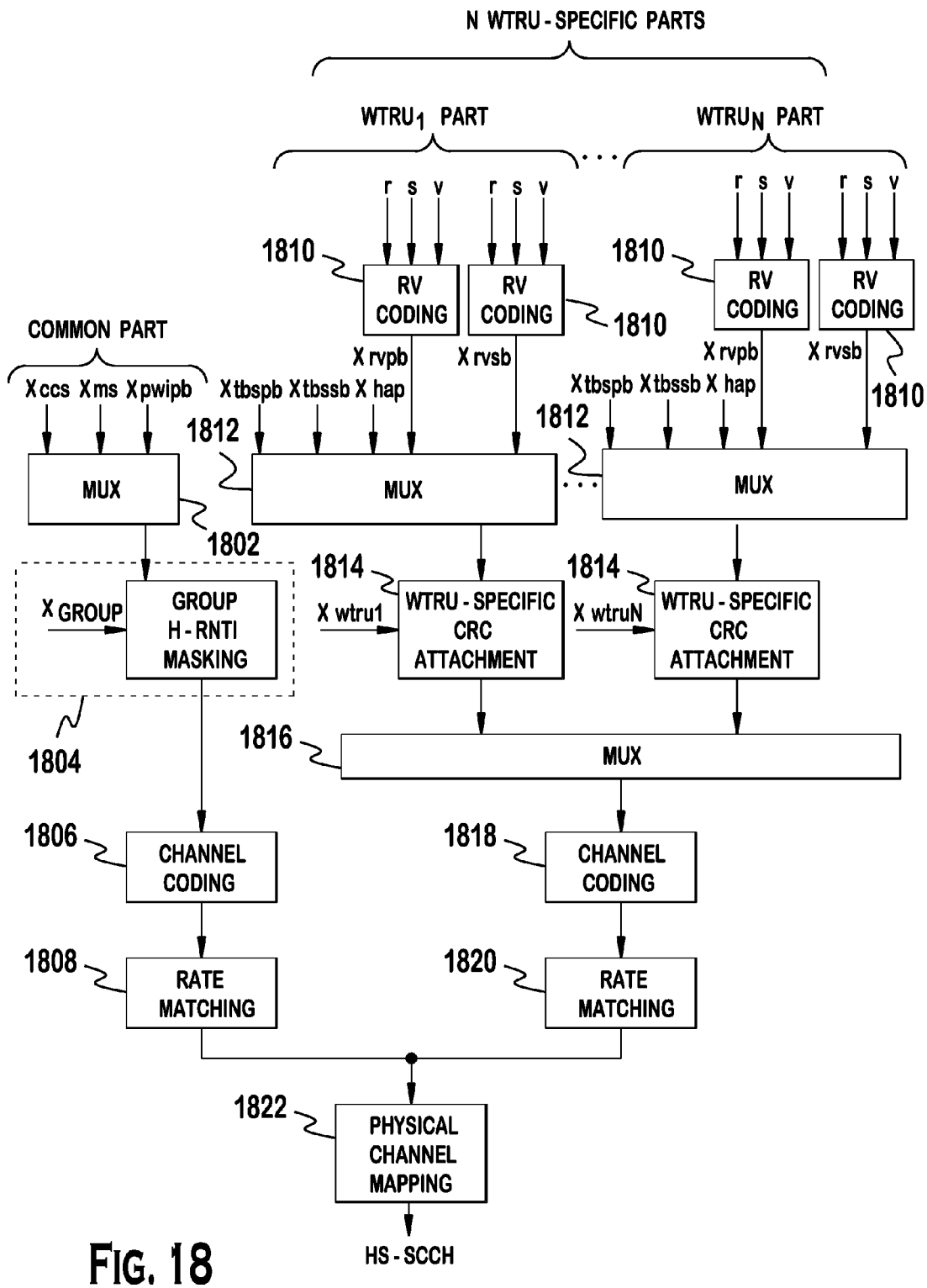
FIG. 18 shows an example encoding chain of the joint HS-SCCH for an MIMO mode.

FIG. 18 shows an example encoding chain of the joint HS-SCCH for an MIMO mode. In this example, channelization code set information $x_{ccs}$, modulation scheme and number of transport blocks information $x_{ms}$, and precoding weight information for the primary transport block $x_{pwipb}$ are the common part. The common part information is multiplexed (1802), and group H-RNTI masking, (e.g., all or part of the common part is XORed with the WTRU identity ($X_{WTRU}$) bits or a sequence derived from the WTRU identity), may be performed (1804), and channel coding and rate matching are performed (1806, 1808). Alternatively, as disclosed above, the group H-RNTI masking (1804) may not be performed on the common part. For each WTRU, the RV parameters r, s and constellation version parameter b are coded jointly to produce the value $X_{rvpb}$ and $X_{rvsb}$ ((1810), transport block size information for the primary transport block $x_{tbspb}$, transport block size information for the secondary transport block $x_{tbssb}$, HARQ process information $x_{hap}$, redundancy and constellation version for the primary and secondary transport blocks $x_{rvpb}$, $x_{rvsb}$ are multiplexed (1812), and WTRU-specific CRC attachment may be performed, (all or part of the CRC bits generated from each WTRU-specific part is XORed with the corresponding WTRU identity ($X_{WTRU}$) bits or a sequence derived from the WTRU identity) (1814). The WTRU-specific parts are then multiplexed (1816) and channel coding and rate matching are performed (1818, 1820). The common part and the WTRU-specific parts are combined and physical channel mapping is performed (1822). Alternatively, WTRU-specific CRC may be attached to the common part and WTRU-specific scrambling may be performed to the WTRU-specific parts.

Upon reception of the HS-SCCH, the WTRU applies the reverse operation to obtain the common and WTRU-specific information. More specifically, the WTRU receives the common part of the HS-SCCH and may apply the group identity mask to determine whether or not the HS-SCCH belongs to its group. If the WTRU determines that the HS-SCCH is directed to its group, the WTRU then may decode the second part (WTRU-specific parts) of the HS-SCCH and attempt decoding each of the WTRU-specific parts with its own H-RNTI or WTRU-specific CRC mask. If the WTRU determines that one of the WTRU-specific parts is directed to itself based on WTRU-specific CRC or WTRU-specific scrambling, the WTRU attempts to decode the associated HS-PDSCH transmission using the HS-SCCH common and WTRU-specific information.

WTRUs report channel quality indication (CQI) to the Node B to provide information to be used in scheduling and network performance optimization. The introduction of TDM may introduce changes (depending on scheduler behaviour) in the interference environment seen by the WTRU on a time-multiplexing slot basis.

The WTRUs may report a CQI feedback on a slot basis. The WTRUs may report a CQI based on multiple slots measurements for the same time-multiplexing slot position in a group of TTI, as the WTRU may see similar interference for each time-multiplexing slot location in the TTI on a TTI by TTI basis. In the following the term slot may also equivalently refer to a time-multiplexing slot.

In one embodiment, 1-slot reference period may be introduced for the CQI for TDM WTRU for both non-MIMO and MIMO cases. When the WTRU is not configured in an MIMO mode, based on an unrestricted observation interval, the WTRU may report the highest tabulated CQI value for which a single HS-DSCH sub-frame formatted with the transport block size, number of HS-PDSCH codes and modulation corresponding to the reported or lower CQI value may be received with a transport block error probability not exceeding 0.1 in a 1-slot reference period ending at least 1 slot before the start of the first slot in which the reported CQI value is transmitted (assuming the legacy HS-DPCCH structure is maintained).

When the WTRU is configured in an MIMO mode, based on an unrestricted observation interval, the WTRU may report the highest tabulated CQI value(s) for which a single HS-DSCH sub-frame formatted with the set of transport block size(s), number of HS-PDSCH codes and set of modulation(s) corresponding to the reported CQI value(s) may be received with individual transport block error probabilities not exceeding 0.1 in a 1-slot reference period ending at least 1 slot before the start of the first slot in which the reported CQI value(s) is/are transmitted (assuming the legacy HS-DPCCH structure is maintained) if the preferred primary precoding vector as indicated by the PCI value reported in the same HS-DPCCH sub-frame may be applied at the Node B for the primary transport block and in case two transport blocks are preferred the precoding vector orthogonal to the preferred primary precoding vector may be applied for the secondary transport block.

A CQI may be reported and the Node B may adjust the transport block size to meet the 1 slot performance.

Alternatively, a CQI may be reported based on transport block size that may be supported in 1-slot, measured over an undefined number of previous slots.

Alternatively, a CQI may be reported based on the transport block size that may be supported in 1-slot, measured during like slots, (e.g., the first slot in each TTI), over an undefined number of slots. The slot to be reported on may be defined by the network, (e.g., Node B or RNC). Alternatively, the slot to be reported on may be chosen by the WTRU. The WTRU may choose the best (or alternatively the worst or median) performing slot. The WTRU may indicate which slot is chosen, by the timing of the CQI report, (e.g., if slot 1 is chosen then the WTRU may transmit the report in the third slot, if slot 2 is chosen the WTRU may transmit the report in the first slot, and if slot 3 is chosen the WTRU may transmit the report in the second slot).

Alternatively, a WTRU may report a CQI for the transport block size that may be supported in 1-slot for each of the slots in a TTI, (e.g., $1^{st}$, $2^{nd}$, $3^{rd}$). A WTRU may report three CQI reports, wherein each CQI is generated based on measurements during like slots, (e.g., the first slot in the TTI for the first slot report, and so on).

The CQI reported for each of the slots may be sent in an order, (e.g., the first slot report, the second slot report, and the third slot report).

Alternatively, the CQI may be reported for each of the slots in a single CQI report. This may require a new CQI table which allows for the reporting of the multiple CQI reports. One report may provide an independent CQI report for each slot, (e.g., for the three slots of the TTI).

Alternatively, the CQI may be reported for each of the slots in a single CQI report as a CQI value for one of the slots, and differential values for the other slots. The slot to be reported and used as the basis for the differential reporting may be defined by the network, or chosen by the WTRU, (e.g., the WTRU may choose the best performing slot and then report the differential values for the other slots). The choice may be signaled by the location of the CQI report, (e.g., if slot 1 is chosen then it may be transmitted in the third slot, if slot 2 is chosen it may be transmitted in the first slot, and if slot 3 is chosen it may be transmitted in the second slot.) Alternatively, the choice may be signaled in the CQI report.

New WTRU categories may be introduced to indicate the WTRU capability to support TDM mode. The WTRU may signal the TDM mode capability to the network through an RRC message. For the new WTRU categories and/or more accurate measurements, a new CQI table may be defined with bigger granularity. Alternatively, part of the conventional CQI table may be reused, (e.g., the new table has the biggest entries which are less than 1/N of the original biggest CQI value). Alternatively, based on multiple individual single slot CQI measurements, a single CQI value may be calculated and listed in the new CQI table.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method for multiplexing data for multiple wireless transmit/receive units (WTRUs) for high speed downlink channels in a transmission time interval (TTI), the method comprising:
   receiving, by a WTRU, a joint high speed shared control channel (HS-SCCH), the joint HS-SCCH including a common part and WTRU-specific parts, the common part including common control information for WTRUs time multiplexed in one TTI, and each of the WTRU-specific parts including WTRU-specific control information for a corresponding WTRU;
   receiving, by the WTRU, a high speed physical downlink shared channel (HS-PDSCH) on a WTRU-specific timeslot within the TTI based on decoding of the joint HS-SCCH with a group WTRU identity;
   determining, by the WTRU, whether the common part of the joint HS-SCCH is directed to the WTRU based on the group WTRU identity;
   determining, by the WTRU, whether any one of the WTRU-specific parts of the joint HS-SCCH is directed to the WTRU based on a WTRU-specific identity; and
   decoding, by the WTRU, the HS-PDSCH using the common control information and the WTRU-specific control information for the WTRU.

2. The method of claim 1 wherein each of the WTRU-specific parts include cyclic redundancy check (CRC) bits masked with a corresponding WTRU identity.

3. The method of claim 1 wherein all or part of each of the WTRU-specific parts is masked with corresponding WTRU identity bits or a bit sequence derived from the corresponding WTRU identity.

4. The method of claim 1 wherein all or a part of the common control information on the common part is masked with group WTRU identity bits or a bit sequence derived from the group WTRU identity.

5. The method of claim 1 wherein the common control information is not masked with any identity.

6. A method for multiplexing data for multiple wireless transmit/receive units (WTRUs) for high speed downlink channels in a transmission time interval (TTI), the method comprising:
   receiving, by a WTRU, a high speed shared control channel (HS-SCCH), the HS-SCCH including a group WTRU identity shared by a group of WTRUs;
   receiving, by the WTRU, a high speed physical downlink shared channel (HS-PDSCH) based on decoding of the HS-SCCH with the group WTRU identity, wherein the HS-PDSCH contains a medium access control (MAC) protocol data unit (PDU), wherein the MAC PDU includes a MAC header and a plurality of individual WTRU MAC payloads for a plurality of WTRUs, and wherein each individual WTRU MAC payload is a payload for a particular WTRU; and
   retrieving, by the WTRU, one individual WTRU MAC payload for the WTRU from the MAC PDU based on corresponding control information in the MAC header on a condition that a dedicated WTRU identity for the WTRU is detected in the MAC header.

7. The method of claim 6 wherein the group WTRU identity is derived from the dedicated WTRU identity.

8. The method of claim 6 wherein the individual WTRU MAC payload is an individual MAC PDU for a particular WTRU.

9. A wireless transmit/receive unit (WTRU) comprising:
   a transceiver operatively coupled to a processor, the transceiver and the processor configured to receive a joint high speed shared control channel (HS-SCCH), decode the joint HS-SCCH with a group WTRU identity, and receive a high speed physical downlink shared channel (HS-PDSCH) on a WTRU-specific timeslot within a transmission time interval (TTI) based on the decoding of the joint HS-SCCH, wherein the joint HS-SCCH includes a common part and WTRU-specific parts, and the common part includes common control information for WTRUs time multiplexed in one TTI, and each of the WTRU-specific parts includes WTRU-specific control information for a corresponding WTRU,
   and wherein the transceiver and processor are configured to determine whether the common part of the joint HS-SCCH is directed to the WTRU based on the group WTRU identity, determine whether any one of the WTRU-specific parts of the joint HS-SCCH is directed to the WTRU based on a WTRU-specific identity, and decode the HS-PDSCH using the common control information and the WTRU-specific control information for the WTRU.

10. The WTRU of claim 9 wherein each of the WTRU-specific parts includes cyclic redundancy check (CRC) bits masked with a corresponding WTRU identity.

11. The WTRU of claim 9 wherein all or part of each of the WTRU-specific parts is masked with corresponding WTRU identity bits or a bit sequence derived from the corresponding WTRU identity.

12. The WTRU of claim 9 wherein all or part of the common control information on the common part is masked with group WTRU identity bits or a bit sequence derived from the group WTRU identity.

13. The WTRU of claim 9 wherein the common control information is not masked with any identity.

14. A wireless transmit/receive unit (WTRU) comprising:
a transceiver operatively coupled to a processor, the transceiver and the processor configured to receive a high speed shared control channel (HS-SCCH) including a group WTRU identity shared by a group of WTRUs, receive a high speed physical downlink shared channel (HS-PDSCH) based on decoding of the HS-SCCH with the group WTRU identity, wherein the HS-PDSCH contains a medium access control (MAC) protocol data unit (PDU), wherein the MAC PDU includes a MAC header and a plurality of individual WTRU MAC payloads for a plurality of WTRUs, wherein each individual WTRU MAC payload is a payload for a particular WTRU, and retrieve one individual WTRU MAC payload for the WTRU from the MAC PDU based on corresponding control information in the MAC header on a condition that a dedicated WTRU identity for the WTRU is detected in the MAC header.

15. The WTRU of claim 14 wherein the group WTRU identity is derived from the dedicated WTRU identity.

16. The WTRU of claim 14 wherein the individual WTRU MAC payload is an individual MAC PDU for a particular WTRU.

17. The method of claim 1 wherein the group WTRU identity is derived from the WTRU-specific identity.

18. The WTRU of claim 9 wherein the group WTRU identity is derived from the WTRU-specific identity.

* * * * *